(12) United States Patent
Hillenaar et al.

(10) Patent No.: US 11,572,866 B2
(45) Date of Patent: Feb. 7, 2023

(54) SYSTEM FOR PLACING A WIND TURBINE ASSEMBLY ON A SUPPORT STRUCTURE

(71) Applicant: Heerema Marine Contractors Nederland SE, Leiden (NL)

(72) Inventors: Maikel Hillenaar, Leiden (NL); Richard Petrus Gerhardus Zoontjes, Leiden (NL); Jurgen Albertus De Jong, Leiden (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 331 days.

(21) Appl. No.: 16/755,240

(22) PCT Filed: Oct. 10, 2018

(86) PCT No.: PCT/NL2018/050667
§ 371 (c)(1),
(2) Date: Apr. 10, 2020

(87) PCT Pub. No.: WO2019/074364
PCT Pub. Date: Apr. 18, 2019

(65) Prior Publication Data
US 2020/0240395 A1 Jul. 30, 2020

(30) Foreign Application Priority Data
Oct. 12, 2017 (NL) ..................... 2019718

(51) Int. Cl.
*F03D 13/10* (2016.01)
*F03D 13/20* (2016.01)
(Continued)

(52) U.S. Cl.
CPC ............. *F03D 13/10* (2016.05); *F03D 13/22* (2016.05); *F03D 13/25* (2016.05); *F03D 13/40* (2016.05); *F05B 2230/6102* (2013.01)

(58) Field of Classification Search
CPC .......... F03D 13/10; F03D 13/22; F03D 13/25; F03D 13/40; F05B 2230/61
See application file for complete search history.

(56) References Cited

U.S. PATENT DOCUMENTS

| 6,595,494 B1 | 7/2003 | Roodenburg et al. |
| 10,550,825 B2 * | 2/2020 | Borøy .................. E04H 12/344 |

(Continued)

FOREIGN PATENT DOCUMENTS

| EP | 2896589 A1 | 7/2015 |
| GB | 2005218 A | 4/1979 |

(Continued)

OTHER PUBLICATIONS

International Search Report and Written Opinion dated Feb. 15, 2019, corresponding to Application No. PCT/NL2018/050667.

(Continued)

*Primary Examiner* — Eldon T Brockman
*Assistant Examiner* — Elton K Wong
(74) *Attorney, Agent, or Firm* — Patterson + Sheridan, LLP

(57) ABSTRACT

A system for placing a wind turbine assembly on a support surface of a support structure being supported on a seabed with a lifting crane provided on a floating vessel, said system can be changed from a first operation mode into a second operation mode to compensate a vertical reciprocal crane movement of the crane relative to the support structure.

20 Claims, 25 Drawing Sheets

(51) Int. Cl.
*F03D 13/25* (2016.01)
*F03D 13/40* (2016.01)

(56) References Cited

U.S. PATENT DOCUMENTS

| | | | |
|---|---|---|---|
| 11,198,597 B2* | 12/2021 | Moeller | B66C 1/108 |
| 2012/0266796 A1* | 10/2012 | Roodenburg | B66C 23/185 |
| | | | 405/224 |
| 2013/0051924 A1* | 2/2013 | Willis | F03D 13/10 |
| | | | 414/803 |

FOREIGN PATENT DOCUMENTS

| | | |
|---|---|---|
| WO | 01/29366 A1 | 4/2001 |
| WO | 2013/113377 A1 | 8/2013 |

OTHER PUBLICATIONS

Netherlands Search Report dated Jun. 25, 2018, corresponding to Application No. 2019718.

* cited by examiner

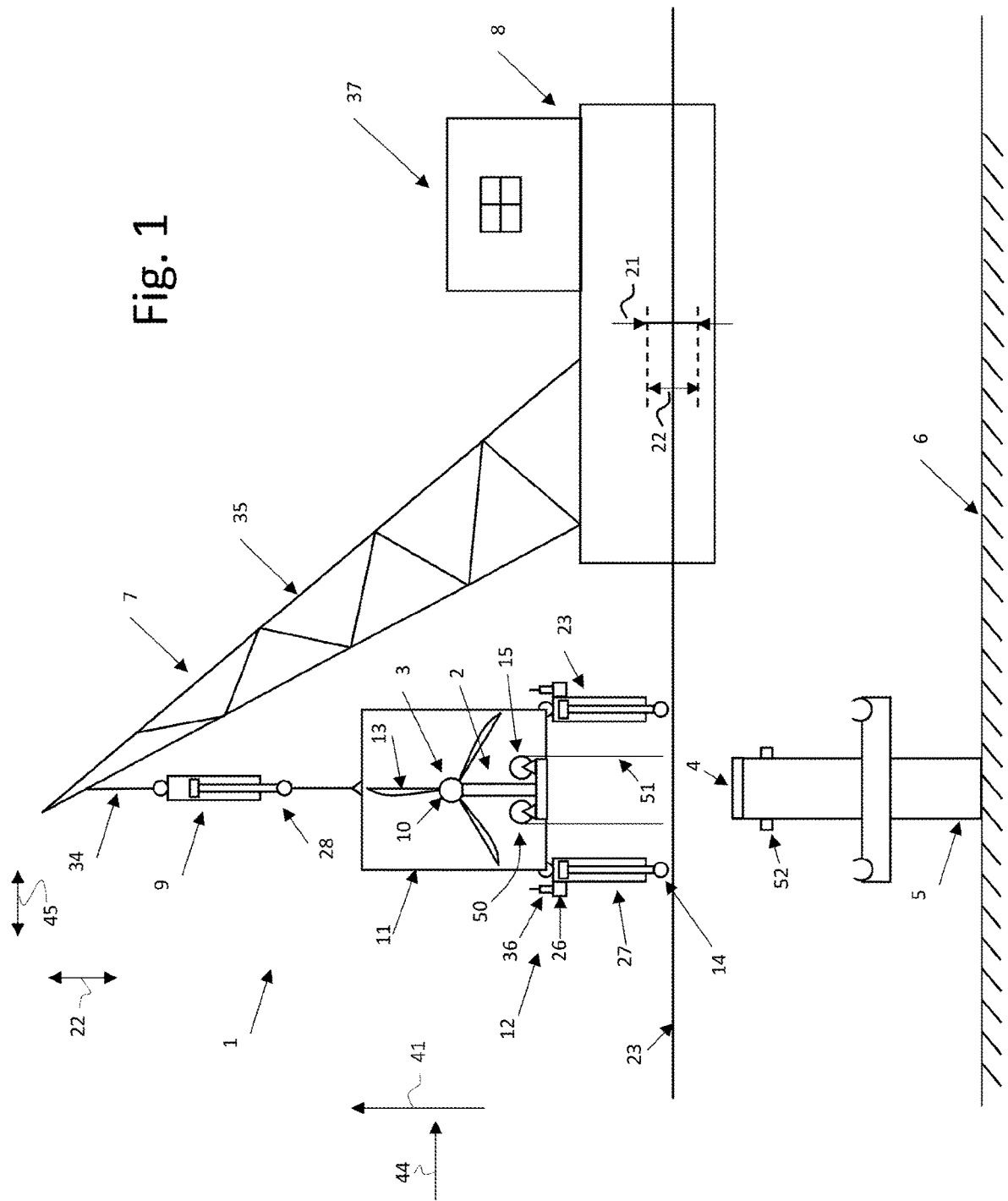

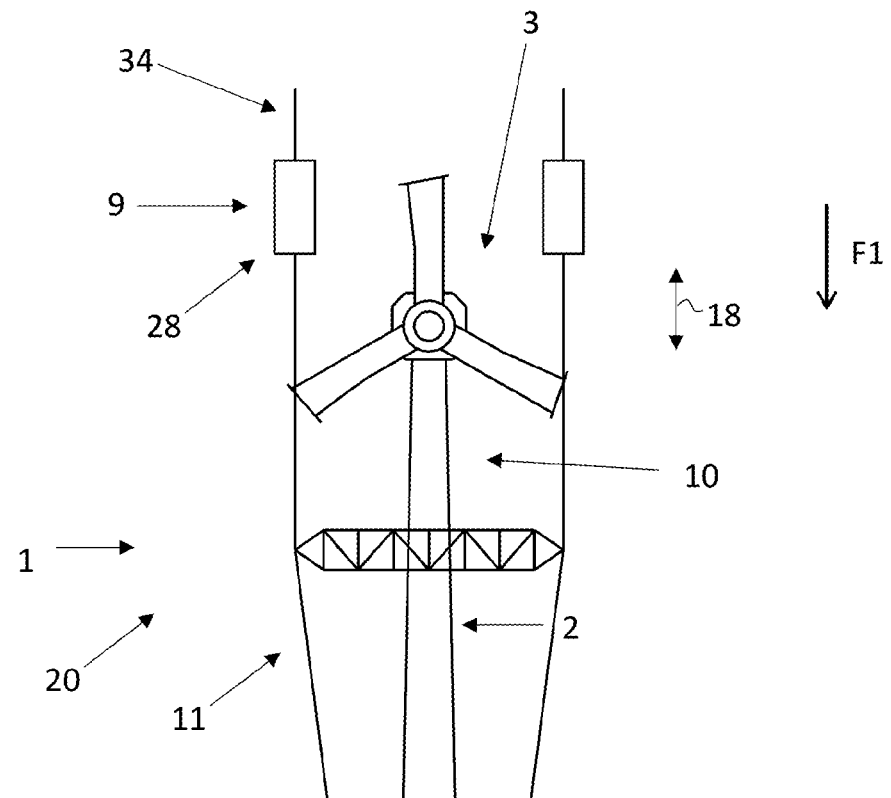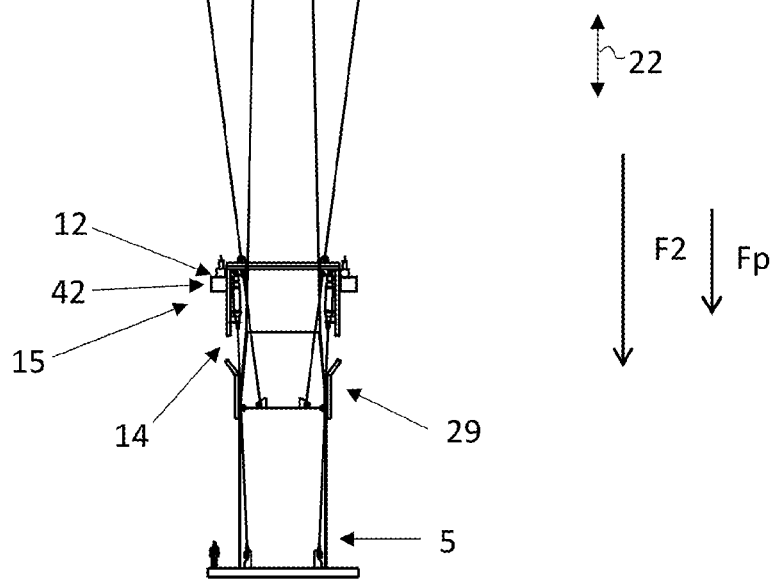
Fig. 8A

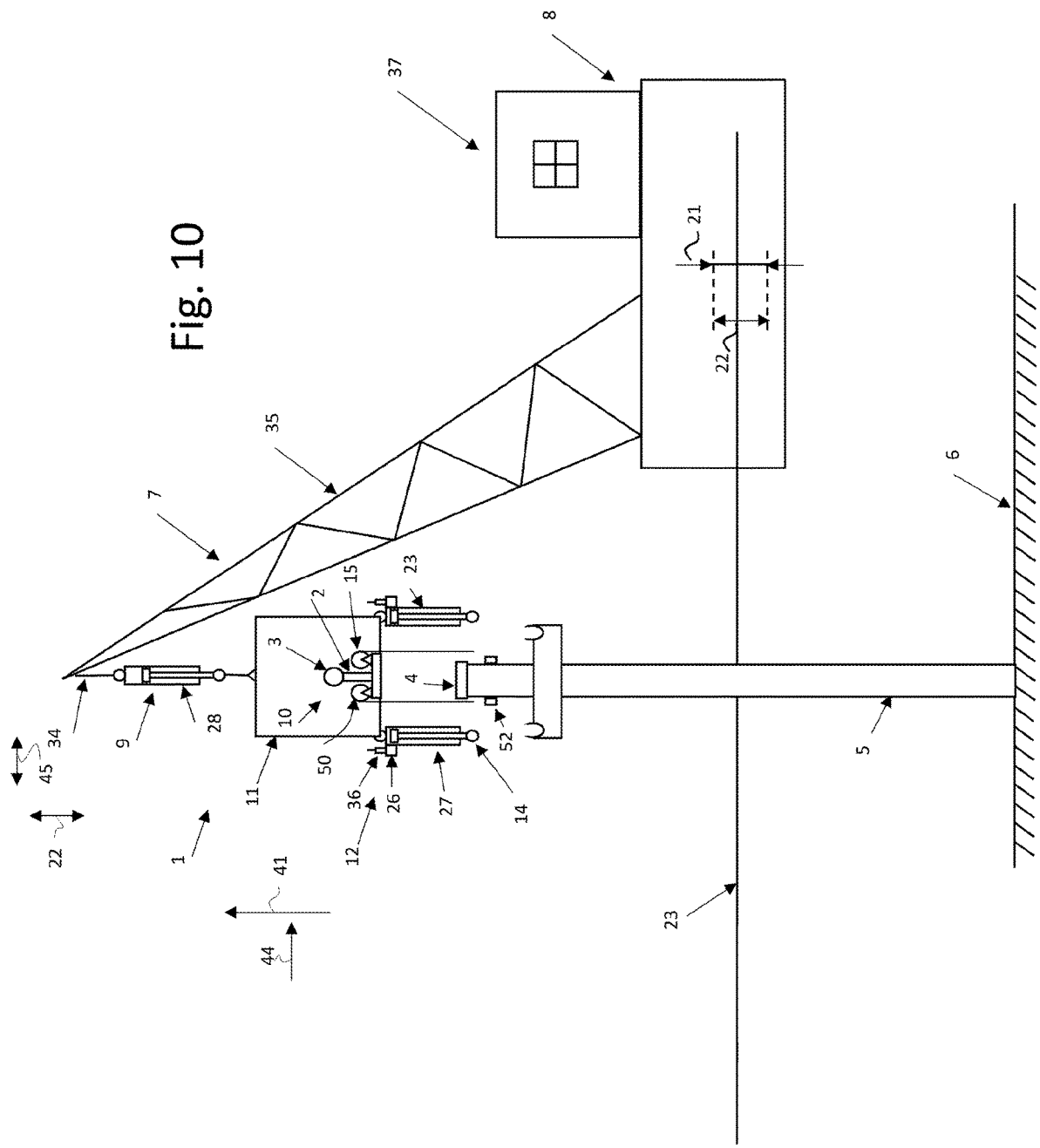

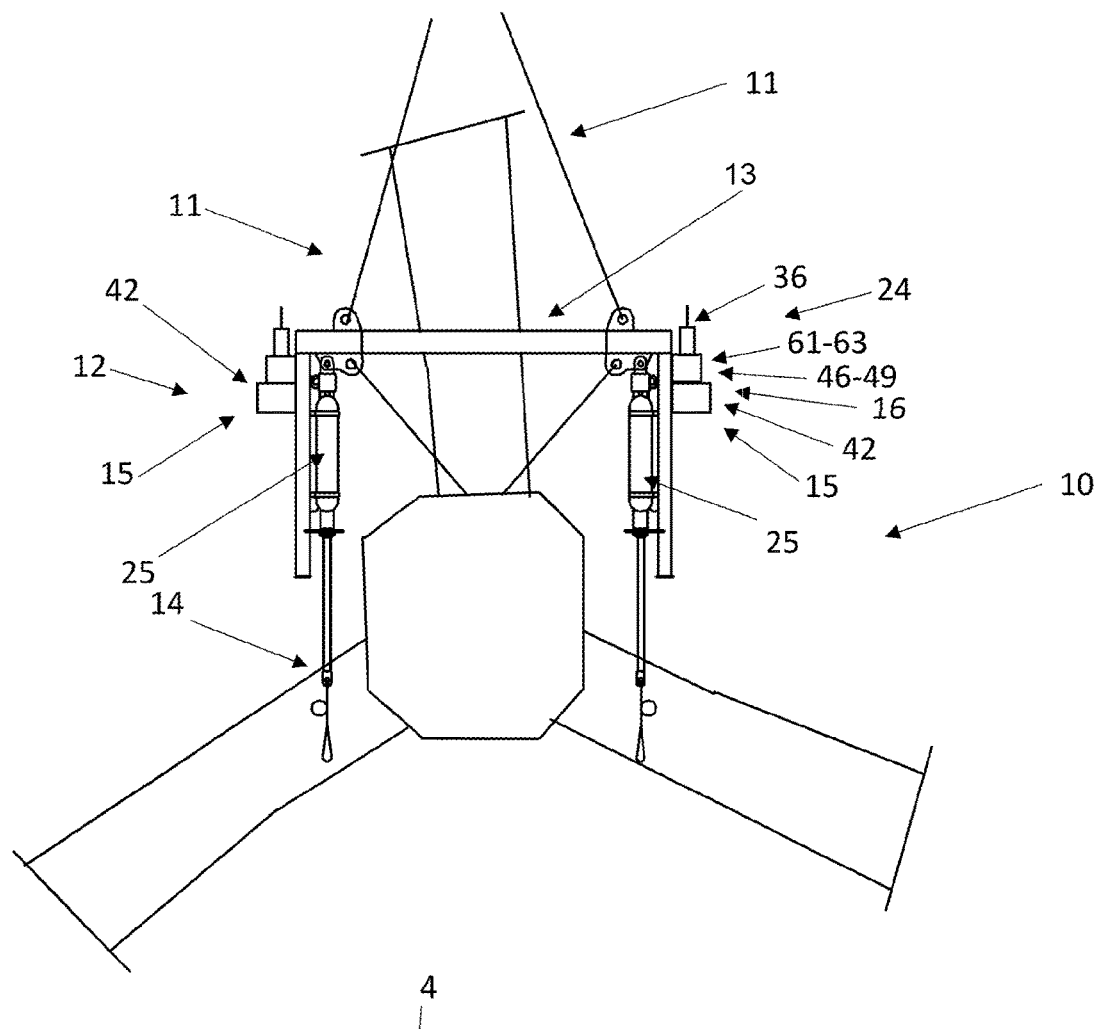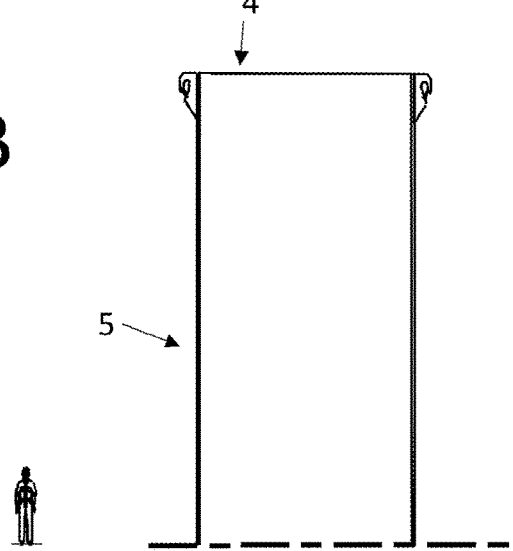
Fig. 11B

US 11,572,866 B2

SYSTEM FOR PLACING A WIND TURBINE ASSEMBLY ON A SUPPORT STRUCTURE

FIELD OF THE INVENTION

The invention relates to a system for placing a wind turbine assembly on a support surface of a support structure being supported on a seabed.

In practice, the known systems are in general used with a lifting crane provided on a jack-up vessel. The jack-up vessel is supported on the seabed during the installation of the wind turbine assembly on the support structure. This way, the jack-up vessel forms a stable basis for the crane lifting the wind turbine assembly, and relative movements between the wind turbine assembly and the support structure are limited.

When a lifting crane mounted on a floating vessel is used for placing a wind turbine assembly on a support surface, the vessel is subjected to different kinds of movements (such as heave, pitch, and roll) which cause reciprocal crane movements of the lifting crane in a vertical direction and in a horizontal direction. These movements can be divided in a vertical reciprocal crane movement and a horizontal reciprocal crane movement. This makes it very difficult to place the wind turbine assembly on the support structure with a floating vessel. Due to the vertical reciprocal crane movement there is a risk that during installation, the wind turbine assembly will bounce hard on the support structure and cause damage to the wind turbine assembly (more specifically to the wind turbine) or the support surface. In practice, the induced reciprocal movement of the wind turbine assembly relative to the support structure in vertical direction will exceed allowable values.

Heave compensation systems are used to reduce or prevent vertical reciprocal movement of the wind turbine assembly suspending from the crane on a floating vessel, but these heave compensation systems are complex systems.

BACKGROUND OF THE INVENTION

The invention is based on the insight that there is a need for a more simple system to place a wind turbine assembly on a support structure being supported on a seabed with a lifting crane provided on a floating vessel.

SUMMARY OF THE INVENTION

The invention has the objective to provide an improved system (or at least alternative system) for placing a wind turbine assembly on a support surface of a support structure being supported on a seabed with a lifting crane provided on a floating vessel. This objective is reached with a system for placing a wind turbine assembly on a support surface of a support structure being supported on a seabed with a lifting crane provided on a floating vessel, said system comprising;

a first counter force device which is attachable to the crane, a first coupling assembly configured to couple the first counter force device to the wind turbine assembly in order to carry the wind turbine assembly, a second counter force device which is attachable to the wind turbine assembly and/or the first coupling assembly, a second coupling assembly configured to couple the second counter force device to the support structure, and a pulling device configured to pull the wind turbine assembly towards and onto the support surface of the support structure, and wherein;

the first counter force device is configured to allow a vertical first reciprocal movement between the crane and the wind turbine assembly and to control the first reciprocal movement by providing a first counteracting force F1 acting against the first reciprocal movement when the crane is moving away from the support structure, the second counter force device is configured to allow a vertical second reciprocal movement of the wind turbine assembly relative to the support structure and to control the second reciprocal movement by providing a second counteracting force F2 acting against the second reciprocal movement when the crane is moving away from the support structure, and the system is adjustable from;

a first operation mode wherein the first counteracting force F1 is larger than the second counteracting force F2 to in use compensate a vertical reciprocal crane movement of the crane relative to the support structure by the second reciprocal movement via the second counter force device and optionally also by the first reciprocal movement via the first counter force device, wherein the second reciprocal movement is larger than the first reciprocal movement, into a second operation mode wherein the first counteracting force F1 is smaller than the second counteracting force F2 to in use compensate the vertical reciprocal crane movement of the crane relative to the support structure by the first reciprocal movement via the first counter force device and optionally also by the second reciprocal movement via the second counter force device, wherein the first reciprocal movement is larger than the second reciprocal movement.

By changing the system from the first operation mode into the second operation mode, the second reciprocal movement of the wind turbine assembly relative to the support structure can be reduced or eliminated. This allows that the wind turbine assembly can be pulled towards and onto the support structure by the pulling device without the risk (or a reduced risk) to damage the wind turbine assembly (including the wind turbine) and/or the support structure.

The wind turbine assembly comprises a wind turbine and optionally a mast. The wind turbine may comprise (a part of) blades or may be free from (a part of) blades.

In an embodiment of the system, the wind turbine assembly comprises a wind turbine and a mast.

In an embodiment of the system, the first coupling assembly is configured to couple the first counter force device to the mast.

In an embodiment of the system, the second counter force device is attachable to the mast and/or the first coupling assembly.

In an embodiment of the system, the pulling device is configured to pull the mast towards and onto the support surface of the support structure.

In an embodiment of the system, the first counter force device and the second counter force device are configured to, in the second operation mode, create a second reciprocal movement which is between 0 and 0.1 times the first reciprocal movement.

In an embodiment of the system, the first counter force device and the second counter force device are configured to, in the second operation mode, create a second reciprocal movement which is about 0 m, or 0 m.

In an embodiment of the system, the first counter force device and the second counter force device are configured to compensate the vertical reciprocal crane movement of the crane in the second operation mode only by the first reciprocal movement via the first counter force device.

In an embodiment of the system, the first counter force device and the second counter force device are configured to, in the first operation mode, create a first reciprocal movement which is between 0 and 0.1 times the second reciprocal movement.

In an embodiment of the system, the first counter force device and the second counter force device are configured to, in the first operation mode, create a first reciprocal movement which is about 0 meter, or 0 meter.

In an embodiment of the system, the first counter force device and the second counter force device are configured to compensate the vertical reciprocal crane movement of the crane in the first operation mode only by the second reciprocal movement via the second counter force device.

In an embodiment of the system, the second counter force device comprises a ratcheting unit configured to prevent that the wind turbine assembly moves back away from the support structure when the wind turbine assembly has moved towards the support structure during the second reciprocal movement.

In an embodiment of the system, the second counter force device and the ratcheting unit are integrated in a hydraulic apparatus comprising a hydraulic circuit having a hydraulic cylinder, a hydraulic fluid, and a pressure control device.

In an embodiment of the system, the hydraulic apparatus is configured to change from the first operation mode into the second operation mode, and vice versa, by adjusting a fluid pressure of the hydraulic fluid in the hydraulic cylinder.

In an embodiment of the system, the ratcheting unit comprises a non-return valve provided in the hydraulic circuit.

In an embodiment of the system, the pulling device is configured to pull the wind turbine assembly towards and onto the support structure via the second coupling assembly and not via the wind turbine assembly.

In an embodiment of the system, the pulling device is integrated in the hydraulic apparatus and the hydraulic cylinder forms part of the pulling device.

In an embodiment of the system, only the second counter force device is configured to adjust its second counteracting force F2, and the first counter force device is configured to apply a constant counteracting force F1.

In an embodiment of the system, the first counter force device comprises a non-adjustable fluid spring.

In an embodiment of the system, the second counter force device comprises an adjustable fluid spring.

In an embodiment of the system, the system comprises a guiding assembly to guide the wind turbine assembly along a vertical guiding trajectory during the vertical reciprocal crane movement, thereby limiting a horizontal wind turbine assembly movement of the wind turbine assembly.

In an embodiment of the system, the guiding assembly is configured to guide the mast of the wind turbine assembly along the vertical guiding trajectory during the vertical reciprocal crane movement.

In an embodiment of the system, the guiding assembly is attachable to the support structure in a guiding use position to position the guiding trajectory above the support surface.

In an embodiment of the system, a guiding length of the guiding trajectory is at least 1.1 times larger than a movement length of the vertical reciprocal crane movement of the crane.

In an embodiment of the system, a guiding length of the guiding trajectory is between 1 and 8 meter.

In an embodiment of the system, the second counter force device is attachable to the first coupling assembly and not to the wind turbine assembly in order to transfer the second counteracting force F2 to the crane via the first coupling assembly.

In an embodiment of the system, the first reciprocal movement and the second reciprocal movement are measured in the vertical direction.

The invention further relates to a floating vessel comprising a lifting crane and a system according to the invention attached to the crane.

The invention further relates to a method of placing a wind turbine assembly on a support surface of a support structure being supported on a seabed with a lifting crane provided on a floating vessel, said method comprising the steps of;

attaching the first counter force device of the system according to the invention to the crane of the vessel, using the first coupling assembly to couple the first counter force device to the wind turbine assembly, attaching the second counter force device to the wind turbine assembly and/or the first coupling assembly, using the crane to position the wind turbine assembly at a starting distance above the support surface of the support structure, which starting distance is larger than a movement length of a vertical reciprocal crane movement of the crane relative to the support structure, setting the system in the first operation mode, wherein the first counteracting force F1 of the first counter force device is larger than the second counteracting force F2 of the second counter force device, operating the second coupling assembly to couple the second counter force device to the support structure, compensating the vertical reciprocal crane movement of the crane by the second reciprocal movement of the wind turbine assembly relative to the support structure via the second counter force device and optionally also by the first reciprocal movement between the crane and the wind turbine assembly via the first counter force device, wherein the second reciprocal movement is larger than the first reciprocal movement, operating the system in the second operation mode, wherein the first counteracting force F1 of the first counter force device is smaller than the second counteracting force F2 of the second counter force device in order to compensate the vertical reciprocal crane movement of the crane by the first reciprocal movement via the first counter force device and optionally also by the second reciprocal movement via the second counter force device, and wherein the first reciprocal movement is larger than the second reciprocal movement, and using the pulling device to pull the wind turbine assembly towards and onto the support surface of the support structure.

The wind turbine assembly comprises a wind turbine and optionally a mast. The wind turbine may comprise (a part of) blades or may be free from (a part of) blades.

In an embodiment of the method, the wind turbine assembly comprises a wind turbine and a mast.

In an embodiment of the method, the first coupling assembly is used to couple the first counter force device to the mast.

In an embodiment of the method, the second counter force device is attached to the mast and/or the first coupling assembly.

In an embodiment of the method, the crane is used to position the mast at the starting distance above the support surface of the support structure.

In an embodiment of the method, the pulling device is used to pull the mast towards and onto the support surface of the support structure.

In an embodiment of the method, the first counter force device and the second counter force device are used to create in the second operation mode a second reciprocal movement which is between 0 and 0.1 times the first reciprocal movement.

In an embodiment of the method, the first counter force device and the second counter force device are used to create in the second operation mode a second reciprocal movement which is about 0 m, or 0 m.

In an embodiment of the method, the vertical reciprocal crane movement of the crane is in the second operation mode only compensated by the first reciprocal movement via the first counter force device.

In an embodiment of the method, the first counter force device and the second counter force device are used to create in the first operation mode a first reciprocal movement which is between 0 and 0.1 times the second reciprocal movement.

In an embodiment of the method, the first counter force device and the second counter force device are used to create in the first operation mode a first reciprocal movement which is about 0 meter, or 0 meter.

In an embodiment of the method, the vertical reciprocal crane movement of the crane is in the first operation mode only compensated by the second reciprocal movement via the second counter force device.

In an embodiment of the method, in the second operation mode, the ratcheting unit of the second counter force device is used to prevent that the wind turbine assembly moves back away from the support structure when the wind turbine assembly has moved towards the support structure during the second reciprocal movement.

In an embodiment of the method, the system is kept in the second operation mode for a specific time period to ensure that the wind turbine assembly is kept by the ratcheting unit at a most lower position above the support surface.

In an embodiment of the method, after the pulling device has pulled the wind turbine assembly onto the support surface, the pulling device keeps applying a pulling force on the wind turbine assembly.

In an embodiment of the method, after the wind turbine assembly has been placed on the support surface, the crane is used to lower the first counter force device towards the support structure in order to create slack in the first coupling assembly.

In an embodiment of the method, the pulling device is used to temporary secure the wind turbine assembly against overturning after the first coupling assembly has been slacked.

In an embodiment of the method, the starting distance is measured when the wind turbine assembly is located at a most upper position of its vertical wind turbine assembly movement induced by the vertical reciprocal crane movement.

In an embodiment of the method, the starting distance and the movement length are measured in a vertical direction.

BRIEF DESCRIPTION OF THE DRAWINGS

Embodiments of the system and the method will be described by way of example only, with reference to the accompanying schematic drawings in which corresponding reference symbols indicate corresponding parts, and in which:

FIG. 1 schematically shows a side view of a first embodiment of the system according to the invention attached to a lifting crane provided on a floating vessel, the FIGS. 2A-2D schematically show a first embodiment of the method according to invention using the system of FIG. 1, the FIGS. 3A-3E schematically show a second embodiment of the method according to invention using a second embodiment of the system according to the invention, FIG. 4 schematically shows a side view of a third embodiment of the system according to the invention attached to a lifting crane provided on a floating vessel, the FIGS. 5A, 5B-8A, 8B schematically show a third embodiment of the method according to the invention using the system of FIG. 4, FIG. 9 schematically shows the hydraulic apparatus used in the system of the FIGS. 3 and 4, FIG. 10 schematically shows a side view of a fourth embodiment of the system according to the invention attached to a lifting crane provided on a floating vessel, the FIGS. 11A and 11B schematically show side views of a fifth embodiment of the system according to the invention attached to a lifting crane provided on a floating vessel, and the FIGS. 12A and 12B schematically show side views of a sixth embodiment of the system according to the invention attached to a lifting crane provided on a floating vessel.

DETAILED DESCRIPTION OF THE DRAWINGS

Figure 2A:
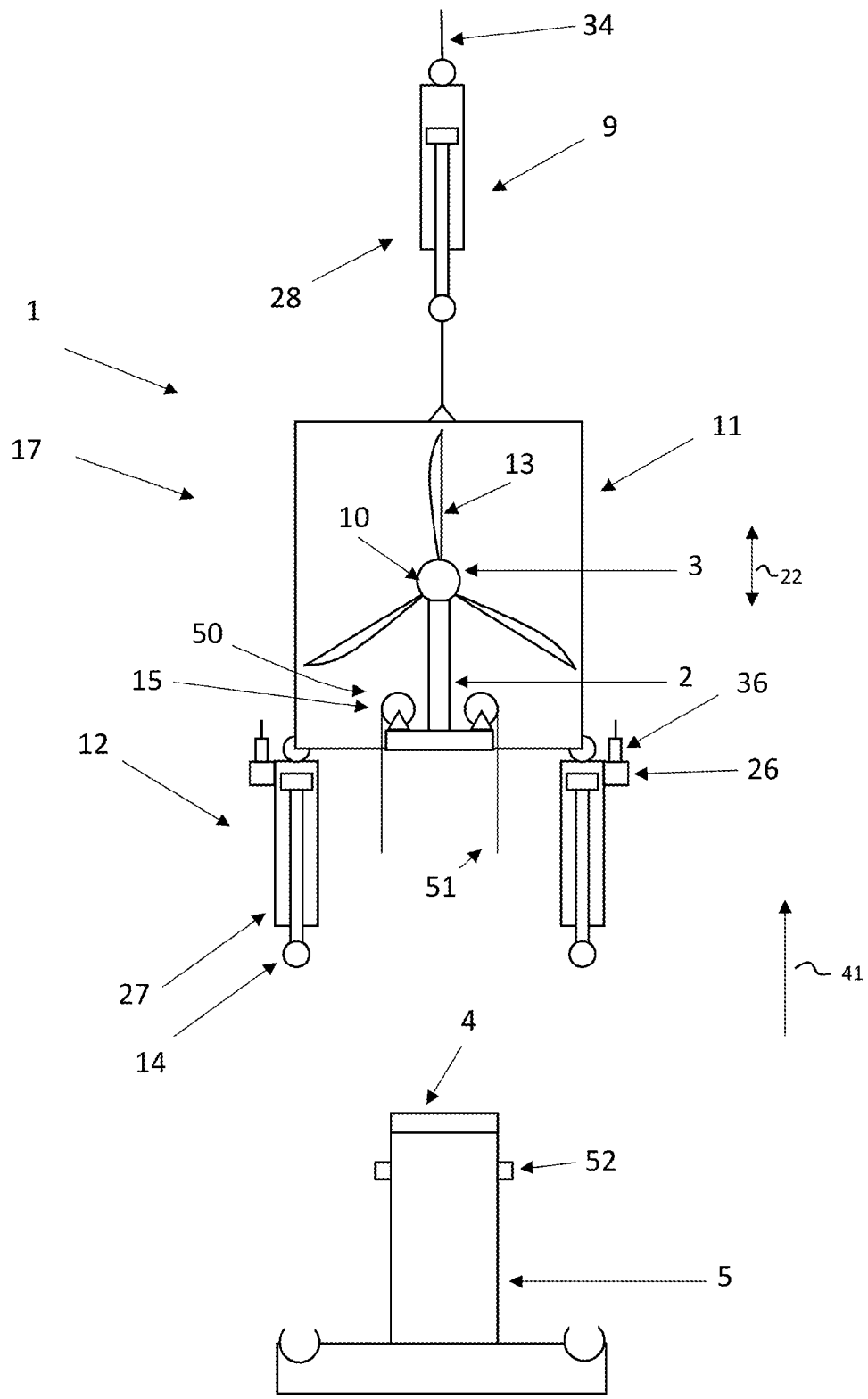

FIG. 1 shows a side view of a first embodiment of the system 1 according to the invention attached to a lifting crane 7 provided on a floating vessel 8. The system 1 is configured to place a wind turbine assembly 10 on a support surface 4 of a support structure 5 being supported on a seabed 6. The support surface 4 of the support structure 5 is located below the water surface 23. The wind turbine assembly 10 comprises a wind turbine 3 and a mast 2. In other embodiments of the system 1, the wind turbine assembly 10 does not comprise a mast 2. The wind turbine 3 comprise blades 13. In other embodiments of the system 1, the wind turbine comprises part of blades 13 or the wind turbine 3 is free from (part of) blades 13.

Since the vessel 8 is floating, it will be subjected to different kinds of movements (such as heave, pitch, and roll) which cause reciprocal crane movements of the crane 7 in a vertical direction 41 and in a horizontal direction 44. These movements can be divided in a vertical reciprocal crane movement 22 and a horizontal reciprocal crane movement 45. The vertical crane movement length 21 is the distance of the vertical reciprocal crane movement 22 of the crane 7 measured in the vertical direction 41.

The system 1 comprises a first counter force device 9 which is attached to the crane 7, more specifically to a lifting cable 34 of the crane 7. In other embodiments of the system 1, the first counter force device 9 is directly attached to the support frame 35 of the crane 7.

The first counter force device 9 is coupled to the wind turbine assembly 10 by a first coupling assembly 11. The wind turbine assembly 2 is carried by the first counter force device 9 via the first coupling assembly 11.

A second counter force device 12 is attached to the first coupling assembly 11. In other embodiments of the system 1, the second counter force device 12 is attached to the wind turbine assembly 10 or to both the wind turbine assembly 10 and the first coupling assembly 11.

The system 1 further comprises a second coupling assembly 14 configured to couple the second counter force device 12 to the support structure 5. In the situation shown, the second coupling assembly 14 is not yet coupled to the support structure 5.

A pulling device 15 is provided to pull the wind turbine assembly 10 towards and onto the support surface 4. The pulling device 15 comprises two pulling winches 50 having a pulling cable 51 which can be coupled to pulling members 52 provided on the support structure 5. The pulling device 15 is configured to couple the wind turbine assembly 10 to the support structure 5 in order to pull the wind turbine assembly 10 towards and onto the support structure 5. In other examples, the pulling device 15 is configured to couple the second counter force device 12 or the second coupling assembly 14 to the support structure 5.

Figure 2B:
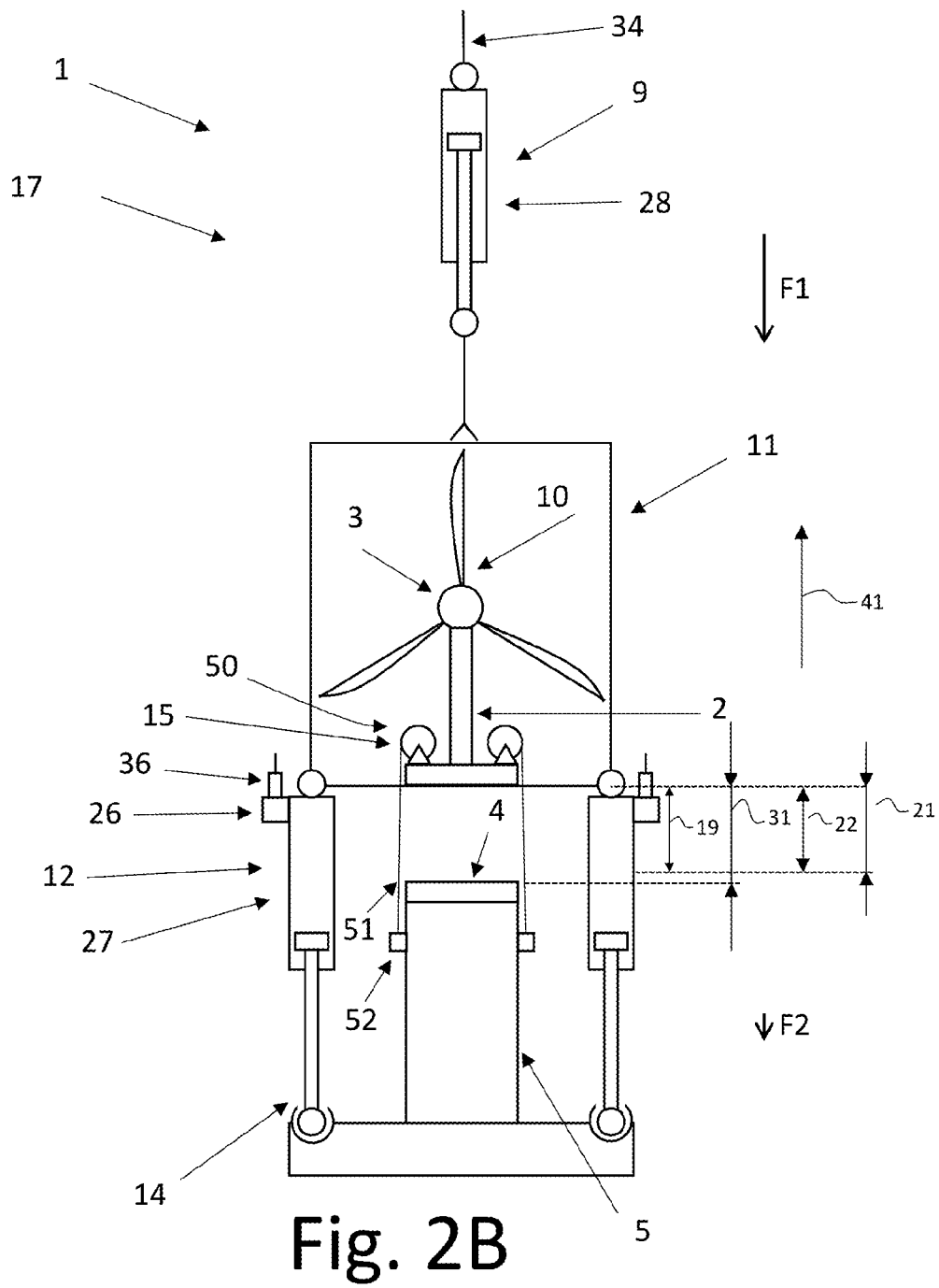
Figure 2C:
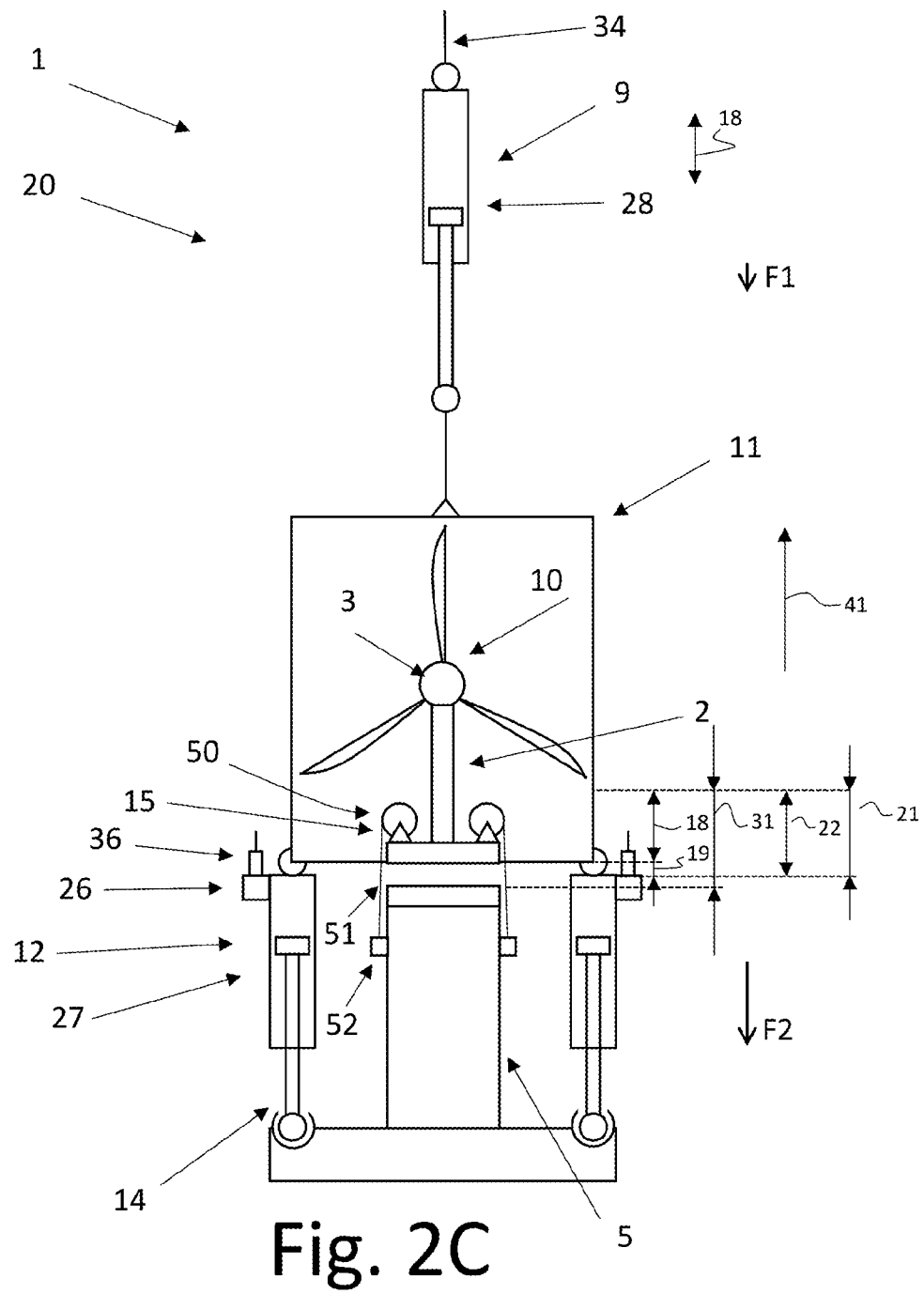

The first counter force device 9 is configured to allow a vertical first reciprocal movement 18 between the crane 7 and the wind turbine assembly 10 and to control the first reciprocal movement 18 by providing a first counteracting force F1 acting against the first reciprocal movement 18 when the crane 7 is moving away from the support structure 5 (see FIG. 2C).

The second counter force device 12 is configured to allow a vertical second reciprocal movement 19 of the wind turbine assembly 10 relative to the support structure 5 and to control the second reciprocal movement 19 by providing a second counteracting force F2 acting against the second reciprocal movement 19 when the crane 7 is moving away from the support structure 5 (see FIG. 2B).

The system 1 is adjustable from a first operation mode 17 (see FIG. 2B) into a second operation mode 20 (FIG. 2B), and vice versa.

In the first operation mode 17, the first counteracting force F1 is larger than the second counteracting force F2 to in use compensate a vertical reciprocal crane movement 22 of the crane 7 relative to the support structure 5 by the second reciprocal movement 19 via the second counter force device 12 and optionally also by the first reciprocal movement 18 via the first counter force device 9, wherein the second reciprocal movement 19 is larger than the first reciprocal movement 18.

In the second operation mode 20, the first counteracting force F1 is smaller than the second counteracting force F2 to in use compensate the vertical reciprocal crane movement 22 of the crane 7 relative to the support structure 5 by the first reciprocal movement 18 via the first counter force device 9 and optionally also by the second reciprocal movement 19 via the second counter force device 12, wherein the first reciprocal movement 18 is larger than the second reciprocal movement 19.

By changing the system 1 from the first operation mode 17 into the second operation mode 20, the second reciprocal movement 19 of the wind turbine assembly 10 relative to the support structure 5 can be reduced or eliminated. This allows that the wind turbine assembly 10 can be pulled towards and onto the support structure 5 by the pulling device 15 without the risk (or a reduced risk) to damage the wind turbine assembly 10 and/or the support structure 5.

In the shown embodiment, the second counter force device 12 is attached to the first coupling assembly 11 and not to the wind turbine assembly 10 in order to transfer the second counteracting force F2 to the first coupling assembly 11 and not to the wind turbine assembly 10.

The system 1 can be adjusted from the first operation mode 17 into the second operation mode 20 by changing the second counteracting force F2 of the second counter force device 12. The first counteracting force F1 of the first counter force device 9 is not changed.

In other examples, the system 1 can be adjusted from the first operation mode 17 into the second operation mode 20 by changing the first counteracting force F1 of the first counter force device 9. The second counteracting force F2 of the second counter force device 12 will not be changed.

In yet another example, the system 1 can be adjusted from the first operation mode 17 into the second operation mode 20 by changing the first counteracting force F1 of the first counter force device 9 and the second counteracting force F2 of the second counter force device 12.

In the shown embodiment, the first counter force device 9 is a non-adjustable counter force device. The first counter force device 9 comprises a non-adjustable fluid spring 28 having a non-adjustable spring stiffness. In the shown situation, the first counter force device 9 comprises one non-adjustable fluid spring 28. In other examples, the first counter force device 9 may comprise multiple non-adjustable fluid springs 28. In yet other examples, the first counter force device 9 comprises one or more non-adjustable helical torsion springs or non-adjustable tension winches.

The second counter force device 12 is an adjustable counter force device. The second counter force device 12 can be adjusted from the first operation mode 17 into the second operation mode 20. The second counter force device 12 comprise two adjustable fluid springs 27 having an adjustable spring stiffness. The second counteracting force F2 is generated by the two adjustable fluid springs 27 together. Each adjustable fluid spring 27 is provided with a fluid pump 26 and a control unit 36 configured to control the fluid pump 26 in order to change the spring stiffness. In other examples, the second counter force device 12 only comprises one adjustable fluid spring 27. In yet other examples, the second counter force device comprises one or more adjustable helical torsion springs or adjustable tension winches.

The pulling device 15 comprises two driven pulling winches 50 having pulling cables 51. The pulling winches 50 are attached to the wind turbine assembly 10, more specifically the mast 2, and the pulling cables 51 can be coupled to pulling members 52 provided on the support structure 5. The driven pulling winches 50 are configured to reel in the pulling cables 51 in order to pull the wind turbine assembly 10, more specifically the mast 2, towards and onto the support structure 5.

The FIGS. 2A-2D show a first embodiment of the method according to the invention using the system 1 of FIG. 1.

FIG. 2A shows the situation of FIG. 1. FIG. 2A differs from FIG. 1 in that the vessel 8 and the crane 7 to which the system 1 is attached are not shown. Also the seabed 6 which supports the support structure 5 is not shown. This applies in the same manner to the FIGS. 2B-2D.

In FIG. 2A, the crane 7 is used to position the wind turbine assembly 10 above the support surface 4 of the support structure 5. The complete system 1 moves in vertical direction 41 along with the vertical reciprocal crane movement 22 of the crane 7. More specifically, the complete system 1 moves along with the part of the crane 7 to which the first counter force device 9 is connected.

In the shown situation, the wind turbine assembly 10 is located at the most upper position of its vertical movements induced by the vertical reciprocal crane movement 22 of the crane 7. This means that the wind turbine assembly 10 will move downwards over a distance equal to the vertical crane movement length 21 of the vertical reciprocal crane movement 22 and will subsequently move upwards again to the shown situation. This cycle is continuously repeated. As the skilled person will understand, in practice there is some variation in the vertical crane movement length 21.

In FIG. 2B, the wind turbine assembly 10 is positioned at a starting distance 31 above the support surface 4 of the support structure 5. The starting distance 31 is larger than the movement length 21 of the reciprocal crane movement 22 of the crane 7 in order to prevent collision of the wind turbine assembly 10, more specifically the mast 2, with the support surface. The starting distance 31 is measured in a vertical direction 41.

In the shown situation, the wind turbine assembly 10 is located at the most upper position of its vertical movements induced by the vertical reciprocal crane movement 22 of the crane 7.

The second counter force device 12 is coupled to the support structure 5 with the second coupling assembly 14.

The system 1 is in the first operation mode 17. The second counteracting force F2 of the second counter force device 12 is very small when compared with the first counteracting force F1 of the first counter force device 9. This is caused by the fact that the combined spring stiffness of the adjustable fluid springs 27 of the second counter force device 12 is very small when compared with the spring stiffness of the non-adjustable spring 28 of the first counter force device 9.

The vertical reciprocal crane movement 22 of the crane 7 relative to the support structure 5 is therefore completely compensated by the second reciprocal movement 19 of the wind turbine assembly 10 relative to the support structure 5 via the second counter force device 12. The first reciprocal movement 18 between the crane 7 and the wind turbine assembly 10 via the first counter force device 9 is about 0 meter.

In FIG. 2C, the system 1 is in the second operation mode 20. This means that the control units 36 are used to increase the spring stiffness of the adjustable fluid springs 28 of the second counter force device 12. The spring stiffness of the adjustable fluid springs 27 of the second counter force device 12 are now much larger than the spring stiffness of the non-adjustable fluid spring 28 of the first counter force device 9. The second counteracting force F2 will therefore be much larger than the first counteracting force F1. As result of this, the vertical reciprocal crane movement 22 of the crane 7 relative to the support structure 5 is mainly compensated by the first reciprocal movement 18 via the first counter force device 9. A much smaller part of the vertical reciprocal crane movement 22 is compensated by the second reciprocal movement 19 via the second counter force device 12. The second reciprocal movement 19 is about 0.1 times the first reciprocal movement 18.

This means that by changing the system 1 from the first operation mode 17 into the second operation mode 20, the second reciprocal movement 19 of the wind turbine assembly 10 relative to the support structure 5 is strongly reduced. This allows that the wind turbine assembly 10 can be pulled towards and onto the support structure 5 by the pulling device 15 with a reduced risk of damage to the wind turbine assembly 10 and/or the support structure 5.

Figure 2D:
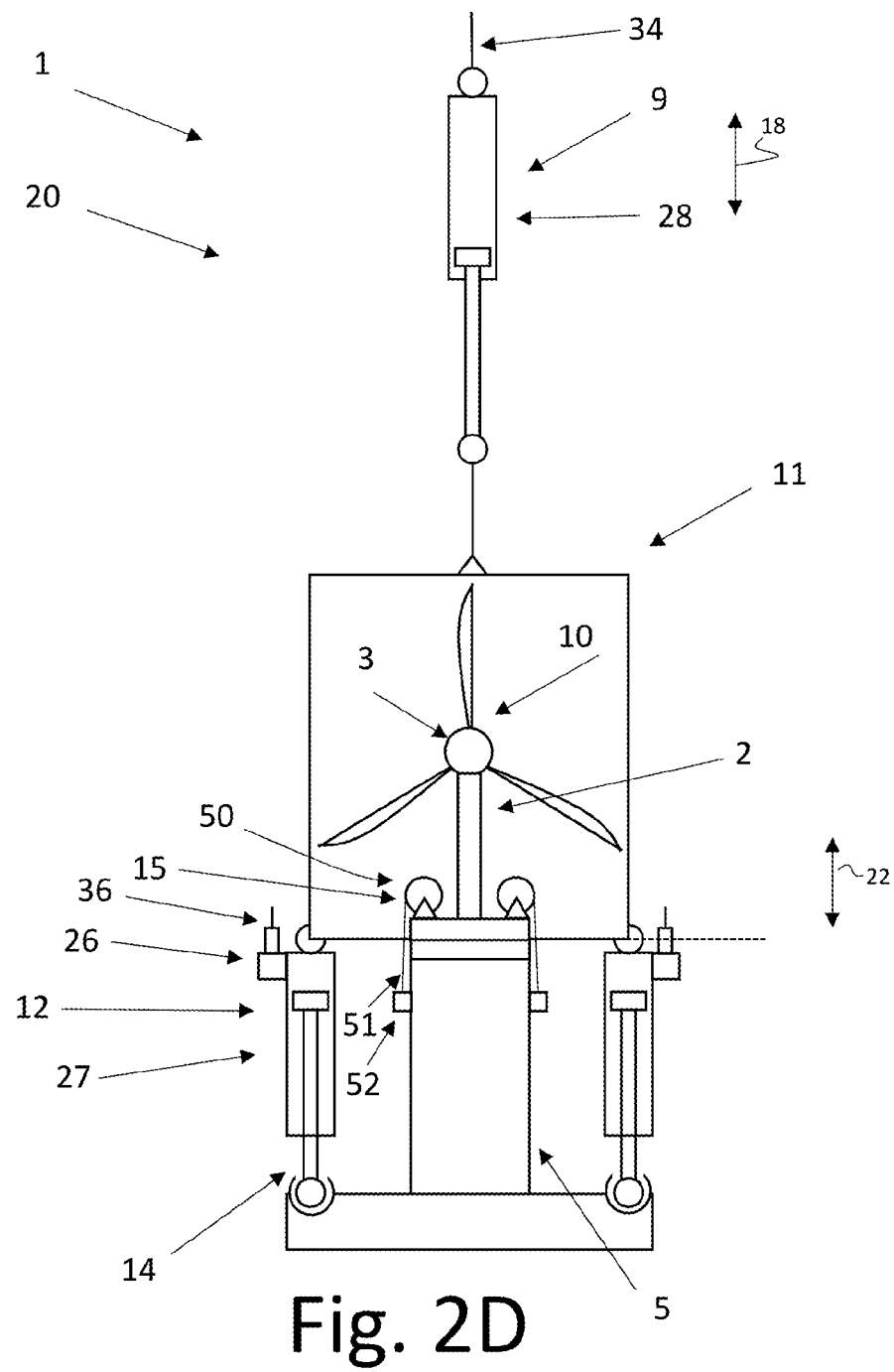

This situation is shown in FIG. 2D. The pulling device 15 provides an additional pulling force Fp which resulted in a controlled pulling of the wind turbine assembly 10 towards and onto support structure 5.

The FIGS. 3A-3E show a second embodiment of the method according to invention. A second embodiment of the system 1 according to the invention is used. This system 1 differs from the one shown in FIG. 1 in that the second counter force device 12 comprises a ratcheting unit 42 configured to prevent that the wind turbine assembly 10 moves back away from the support structure 5 when the wind turbine assembly 10 has moved towards the support structure 5 during the second reciprocal movement 19.

The second counter force device 12 and the ratcheting unit 42 are integrated in a hydraulic apparatus 24. The hydraulic apparatus 24 comprising two hydraulic circuits 16 having a hydraulic cylinder 25, a hydraulic fluid, and a pressure control device 32. The hydraulic cylinders 25 comprise a cylinder barrel 38 in which a piston 39 connected to a piston rod 40 is provided.

Figure 9:
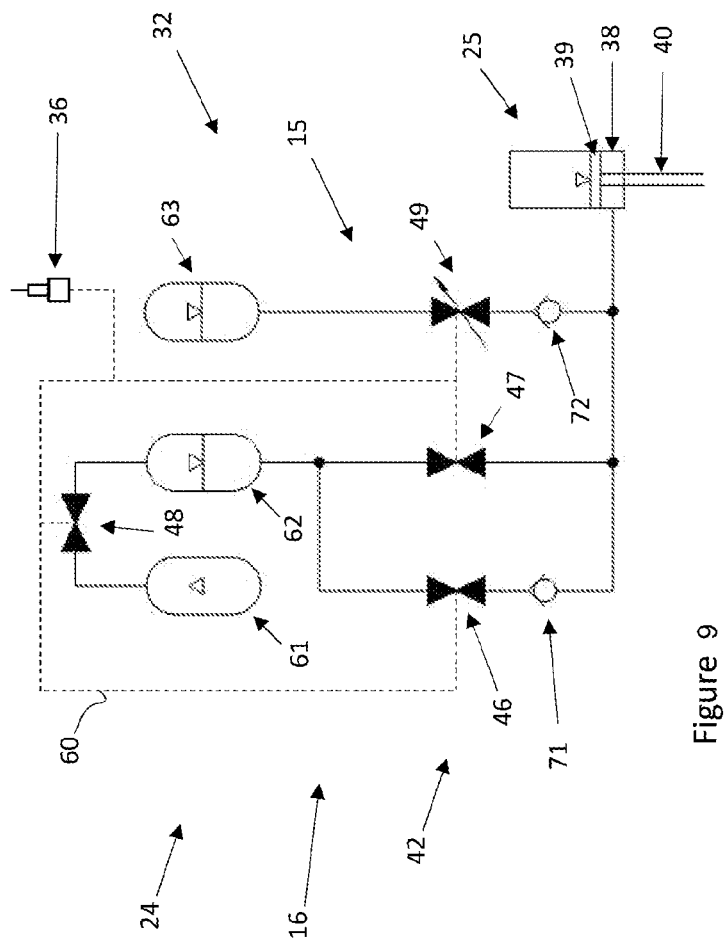

One of the hydraulic circuits 16 of the hydraulic apparatus 24 is shown more in detail in FIG. 9. The hydraulic apparatus 24 is configured to change from the first operation mode 17 into the second operation mode 20, and vice versa, by adjusting a fluid pressure of the hydraulic fluid in the hydraulic cylinders 25.

The pressure control device 32 controls said adjusting of the fluid pressure in the hydraulic cylinders 25. The pressure control device 32 comprises a control unit 36, a first, second and third hydraulic accumulator 61-63 and four adjustable valves 46-49. The hydraulic accumulators 61-63 and the adjustable valves 46-49 are connected to the hydraulic cylinder 25 by fluid ducts 59. The adjustable valves 46-49 communicate with the control unit 36 via communication lines 60. The control unit 36 has a wireless connection with a control room 37 located on the vessel 8 (similar as the one shown in FIG. 1).

The first and second hydraulic accumulator 61, 62 and the first, second, and third adjustable valve 46-48 function as part of the second counter force device 12.

A first and second non-return valve 71, 72 are provided at different locations in the fluid ducts 59 to function as part of the ratcheting unit 42.

The pulling device 15 is also integrated in the hydraulic apparatus 24 and makes use of the hydraulic cylinders 25. The third hydraulic accumulator 63 and the fourth adjustable valve 49 function as part of the pulling device 15.

In other examples, the pressure control device 32 comprises other means to increase the pressure of the hydraulic fluid in the hydraulic cylinder 25, such as pumps or medium separators.

In yet other examples, the hydraulic apparatus 24 comprises only one hydraulic circuit 16 which may have one or more hydraulic cylinders 25.

In yet other examples, the pulling device 15 is not integrated in the hydraulic apparatus 24 and comprises one or more pulling winches (e.g. as shown in the first embodiment).

In another embodiment of the system 1, the second counter force device 12 comprises a variable tension winch and the pulling device 15 is formed by a winch drive to actively rotate said tension winch. In said situation, the ratcheting unit 42 is configured to prevent that the tension winch is rotated back beyond the point that the winch drive has rotated said winch. In the shown embodiment, the first counteracting force F1 of the first counter force device 9 and the second counteracting force F2 of the second counter force device 12 ensure in the first operation mode 17 that the first reciprocal movement 18 is about 0 meter. In the second operation mode 20, the counteracting force F1 of the first counter force device 9 and the second counteracting force F2 of the second counter force device 12 ensure that the second reciprocal movement 19 is about 0 meter.

Due to the elasticity of the used components as well as all the forces induced by the environment on the floating vessel 8, the crane 7, and the wind turbine assembly 10, it will be very difficult to reach a first reciprocal movement 18 of exactly 0.00 meter in the first operation mode 17 and a second reciprocal movement 19 of exactly 0.00 meter in the second operation mode 20. This is the reason that reference is made to a first reciprocal movement 18 and a second reciprocal movement 19 of about 0 meter. In practice, the skilled person would refer to this situation as a first reciprocal movement 18 and a second reciprocal movement 19 of 0 meter.

Figure 3A:
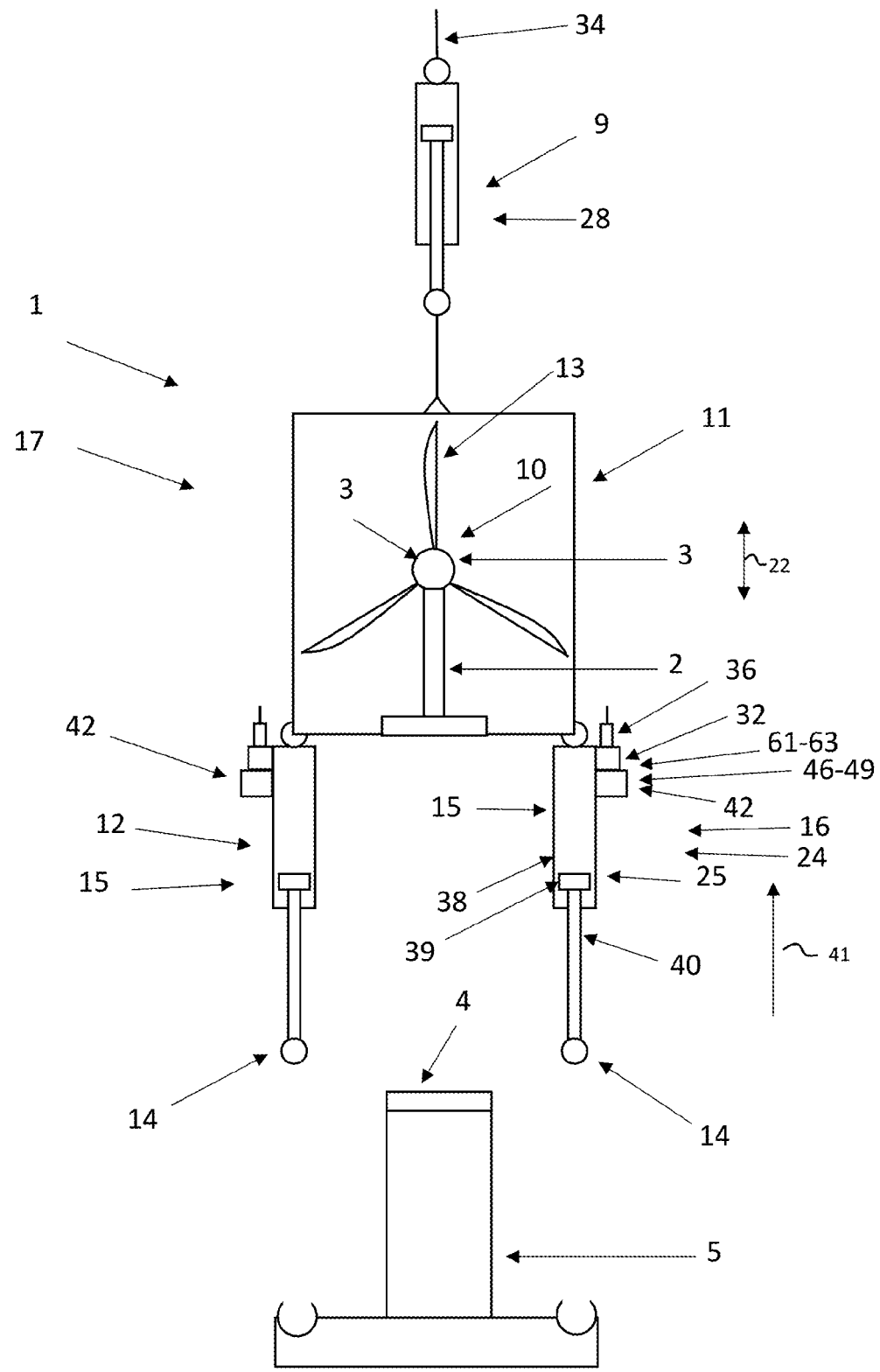

In FIG. 3A, the crane 7 is used to position the wind turbine assembly 10 above the support surface 4 of the support structure 5. The complete system 1 moves along with the vertical reciprocal crane movement 22 of the crane 7. The wind turbine assembly 10 is located at the most upper position of its movement induced by the vertical reciprocal crane movement 22 of the crane 7.

In the situation of FIG. 3A, the four adjustable valves 46-49 are closed. As a result of this, the hydraulic fluid in the hydraulic cylinders 25 is not under pressure.

Figure 3B:
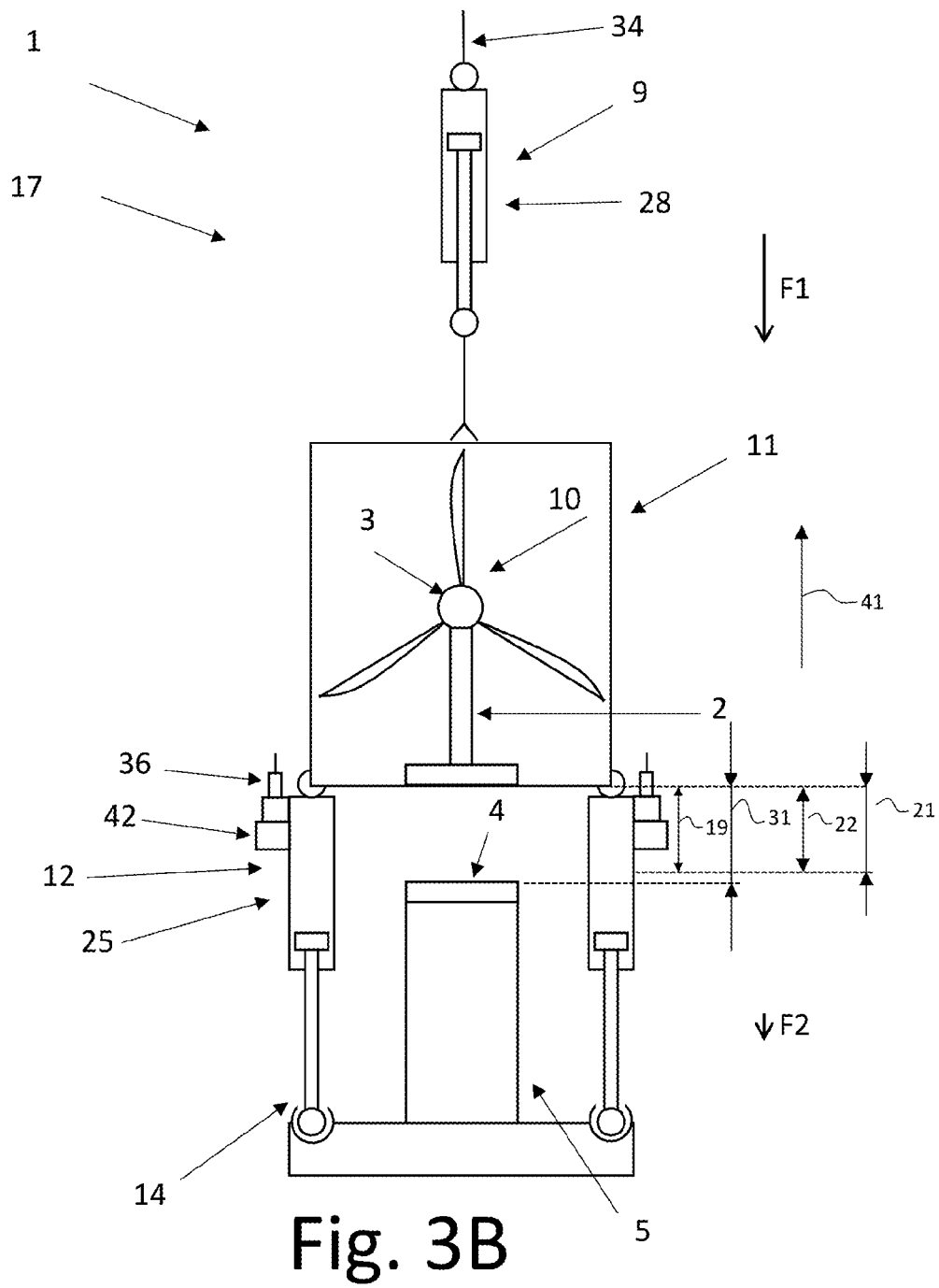

In FIG. 3B, the wind turbine assembly 10 is positioned at a starting distance 31 above the support surface 4. The starting distance 31 is larger than the vertical crane movement length 21 of the vertical reciprocal crane movement 22 of the crane 7. The starting distance 31 is measured in a vertical direction 41.

In the shown situation, the wind turbine assembly 10 is located at the most upper position of its movement induced by the vertical reciprocal crane movement 22 of the crane 7. The system 1 is in the first operation mode 17. The second counter force device 12 is coupled to the support structure 5 with the second coupling assembly 14. The vertical reciprocal crane movement 22 of the crane 7 is compensated by the second reciprocal movement 19 of the wind turbine assembly 10 relative to the support structure 5 via the second counter force device 12. At this stage, the second counter force device 12 provides a relatively small second counteracting force F2 which is negligible when compared with the first counteracting force F1 of the first counter force device 9. The first reciprocal movement 18 between the crane 7 and the wind turbine assembly 10 via the first counter force device 9 is about 0 meter.

In this situation, the second adjustable valve 47 will be open, and the other adjustable valves 46, 48, 49 are closed. This allows the relatively low pressure from the second hydraulic accumulator 62 to apply the relatively small second counteracting force F2. The piston 39 is allowed to move up and down in barrel 38 with relatively little resistance.

Figure 3C:
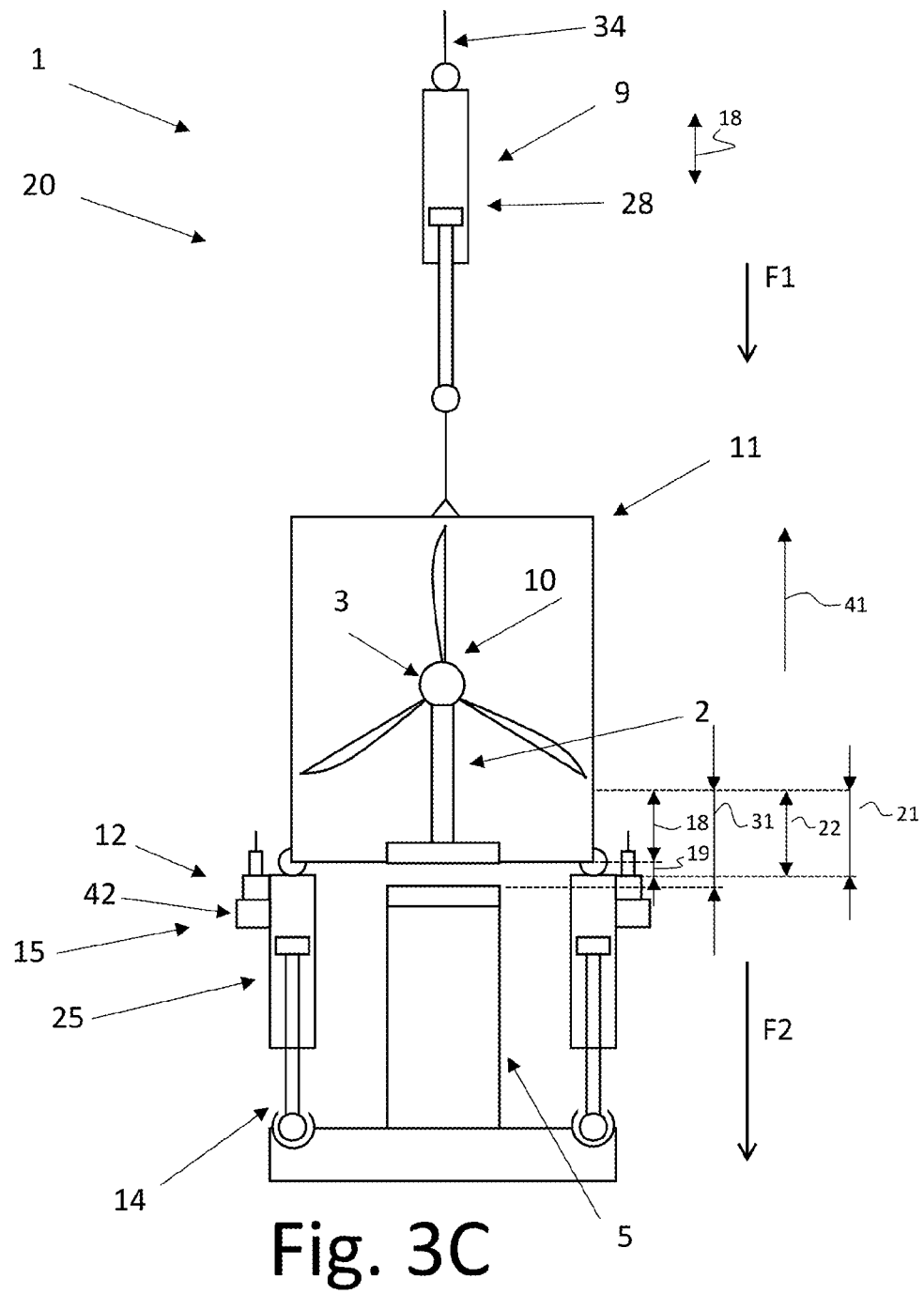

In FIG. 3C, the system is set in the second operation 20 mode by increasing the fluid pressure of the hydraulic fluid in the hydraulic cylinders 25. As result of this, the second counteracting force F2 of the second counter force device 12 is increased such that the vertical reciprocal crane movement 22 of the crane 7 relative to the support structure 5 is compensated by the first reciprocal movement 18 via the first counter force device 9. The second reciprocal crane movement 19 is about 0 meter.

To achieve this, the first and third adjustable valves 46, 48 are opened, the second adjustable valve 47 is closed and the fourth adjustable valve 49 remains closed. The opening of the first and third adjustable valve 46, 48 allows the hydraulic fluid of the first and second accumulator 61, 62 to increase the pressure in the hydraulic circuit in the hydraulic cylinder. The pressure of the first accumulator 61 is very high when compared with the relatively low pressure in the second accumulator 62. The hydraulic fluid with high pressure reaches the hydraulic cylinder 25 below the piston 39 and at the side of the piston rod 40. This will result in an increased second counteracting force F2.

The first non-return valve 71 of the ratcheting unit 42 allows that the piston 39 is able to move upwards in the hydraulic cylinder 25 as the wind turbine assembly 10 moves downwards towards the support structure 5. The first non-return valve 71 prevents that the piston 39 can move downwards again, thereby preventing that the wind turbine assembly 10 moves back upwards and away from support structure 5. This way the wind turbine assembly 10 is kept at its most lower position relative to the support structure 5.

As mentioned before, the vertical reciprocal crane movement 22 will in practice vary at a certain extent. As a result of this, the first and second reciprocal movement 18, 19 that would be induced by the vertical reciprocal crane movement 22 will also vary. The system 1 is therefore kept in the second operation mode 20 for a specific time period to ensure that the wind turbine assembly 10 is held by the ratcheting unit 42 at a most lower position above the support surface 4 within said variety. The second reciprocal movement 19 of the wind turbine assembly 10 relative to the support structure 5 will at the end of the time period be about 0 meter at the most lower position above the support surface 4 of the support structure 5.

Figure 3D:
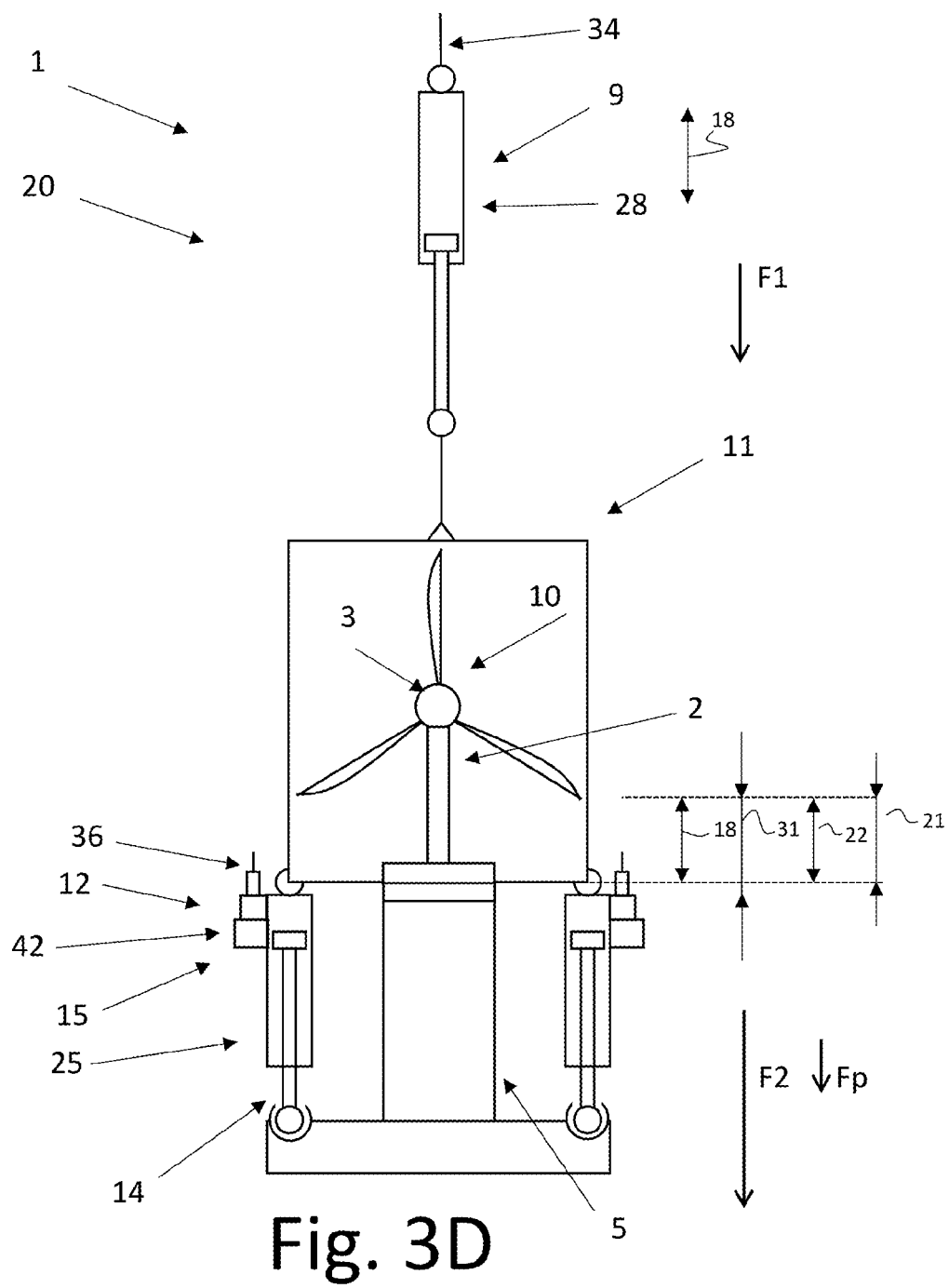

In FIG. 3D, the pulling device 15 has been used to pull the wind turbine assembly 10 towards and onto the support structure 5. The pulling device 15 is configured to pull the wind turbine assembly 10 towards and onto the support structure 5 via the second coupling assembly 12 and not via the wind turbine assembly 10. This way it is prevented that the pulling forces are acting directly on the wind turbine assembly 10. The pulling device 15 has pulled the wind turbine assembly 10 from the most lower position above the support surface 4 as shown in FIG. 3C onto the support structure 5.

To achieve this, the first and third adjustable valves 46, 48 remain open and the second adjustable valve 47 remains closed. The fourth adjustable valve 49 is gradually opened. This regulates a flow of the hydraulic fluid from the third hydraulic accumulator 63 which will further increasing the pressure of the hydraulic fluid in the hydraulic cylinder 25 and provide an additional pulling force Fp. This will result in a controlled pulling of the wind turbine assembly 10 towards and onto support structure 5 by pushing the pistons 39 further upwards in the hydraulic cylinder 25. The second non-return valve 72 is providing an additional ratcheting function to ensure that the wind turbine assembly 10 will not move back away from the support structure 5 during this pulling operation of the wind turbine assembly 10 onto the support structure 5.

After the pulling device 15 has pulled the wind turbine assembly 10 onto the support surface 4, the pulling device 15 keeps applying its pulling force Fp on the wind turbine assembly 10. This way, the wind turbine assembly 10 is positioned on the support structure 5 in a stable manner.

In addition to this, the second counter force device 12 also keeps applying the second counteracting force F2 on the wind turbine assembly 10. In other embodiments (e.g. wherein the second counter force device 12 and the pulling device 15 are not integrated), it is possible that only the pulling device 15 keeps applying its pulling force Fp on the wind turbine assembly 10.

Figure 3E:
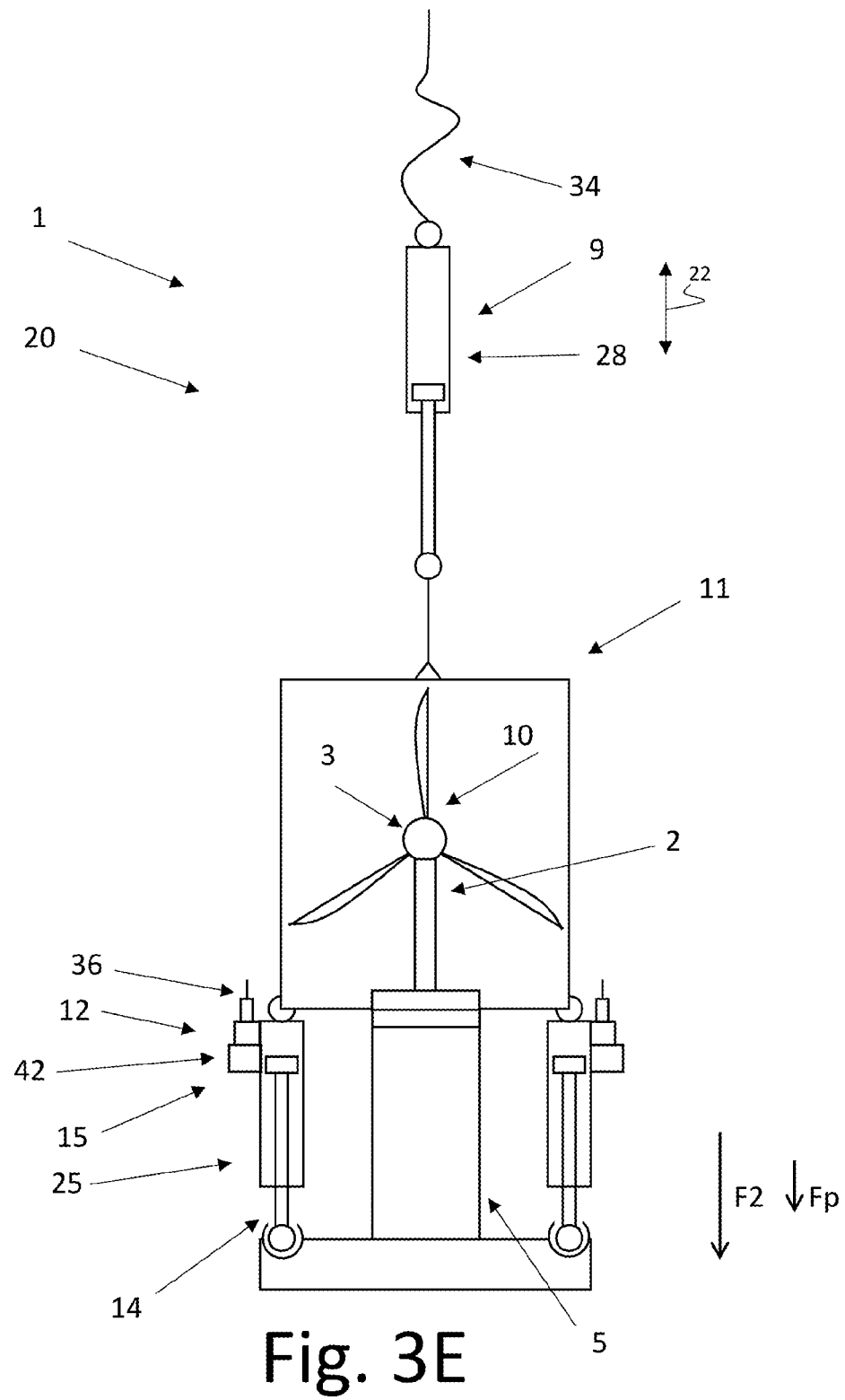

In FIG. 3E, the wind turbine assembly 10 is supported by the support structure 5 and the crane 7 is used to lower the first counter force device 9 towards the support structure 5 in order to create slack in the first coupling assembly 11. The pulling device 15 keeps applying its pulling force Fp on the wind turbine assembly 10 in order to temporary secure the wind turbine assembly 10 against overturning after the first coupling assembly 11 has been slacked.

After the wind turbine assembly 10 has been secured on the support structure 5, the pulling force Fp of the pulling device 15 can be removed and also the second counteracting force F2 of the second counter force device 12 can be removed in a safe manner.

The slack created by the lowering of the crane 7 allows that the first counter force device 9 moves along with the vertical reciprocal crane movement 22 of the crane 7 while the wind turbine assembly 10 remains positioned on the support structure 5.

After that, the first coupling assembly 11 can be decoupled from the wind turbine assembly 10 and the second coupling assembly 14 can be decoupled from the support structure 5 in order to remove the system 1 and use it for placing another wind turbine assembly 10 on another support structure 5 with the vessel 8. Before starting the placing of another wind turbine assembly 10, one must ensure that the system 1 is set in the first operation mode 17.

Figure 4:
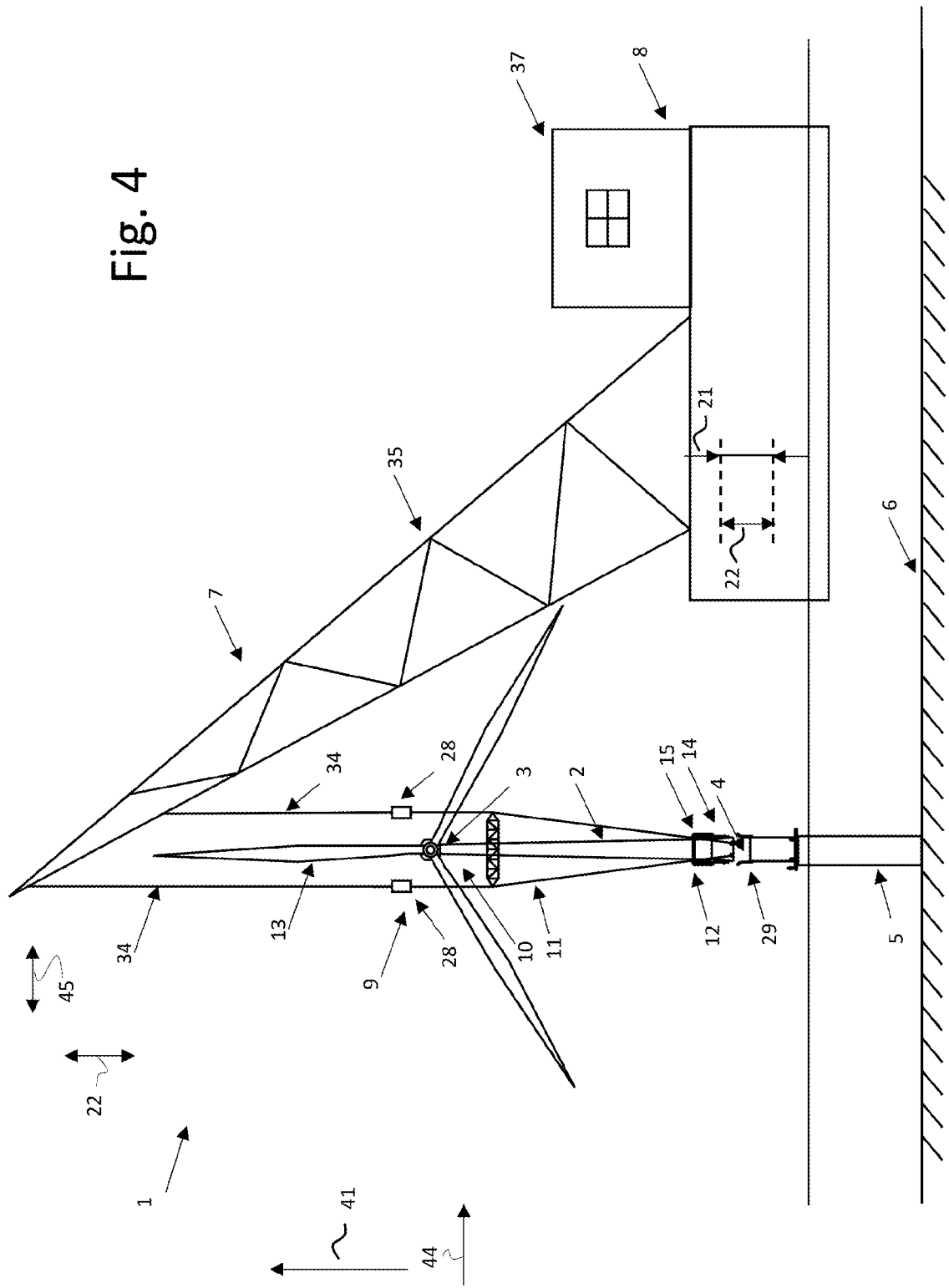

FIG. 4 shows a side view of a third embodiment of the system 1 according to the invention attached to a lifting crane 7 provided on a floating vessel 8. In another embodiment, the system 1 is attached to two lifting cranes 7.

The FIGS. 5A, 5B-8A, 8B show a third embodiment of the method according to invention using the system 1 of FIG. 4. The system 1 functions in a similar manner as the embodiment of the FIGS. 3A-3E. The system 1 differs from the embodiment of the FIGS. 3A-3E in that a guiding assembly 29 is provided.

Figure 5A:
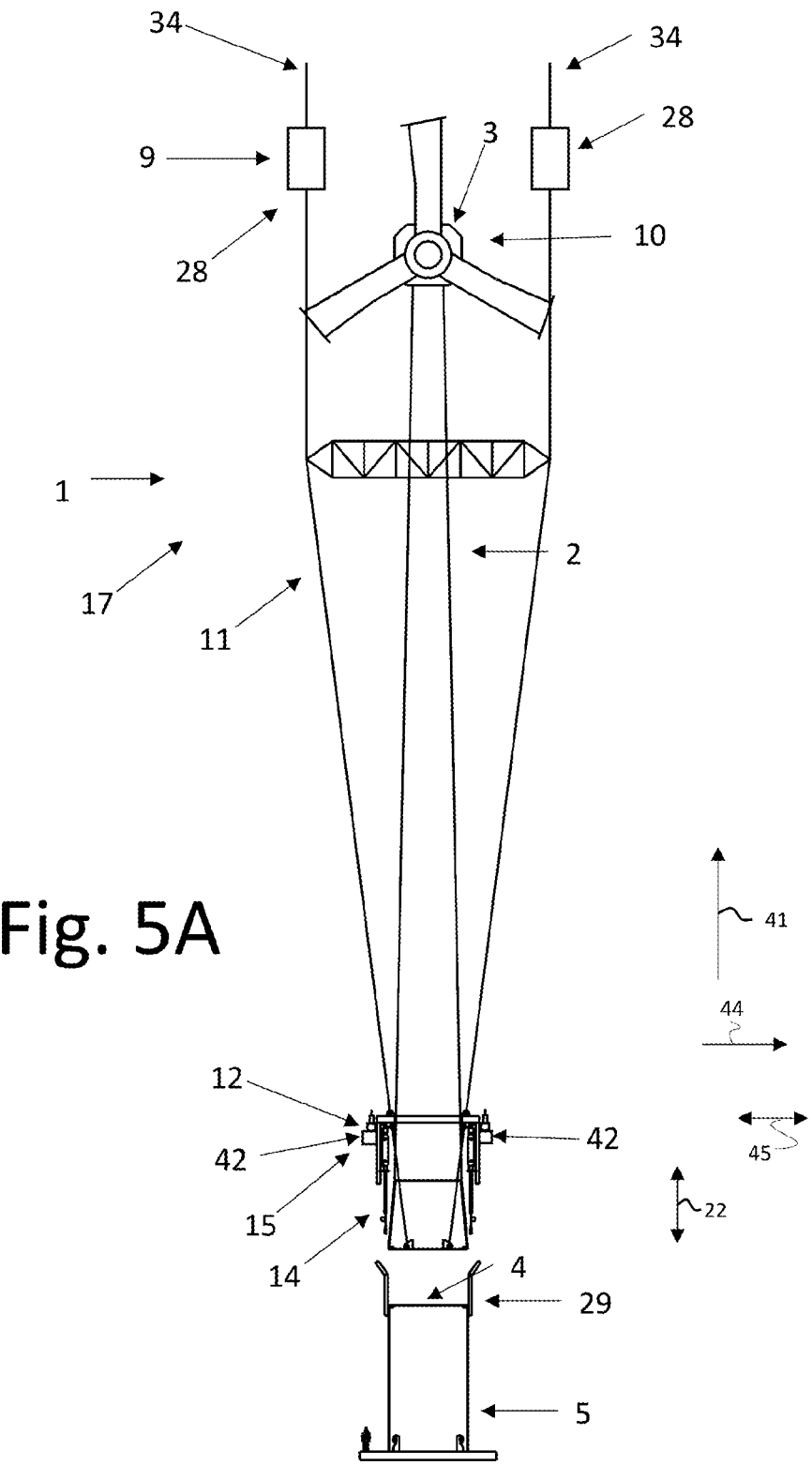
Figure 5B:
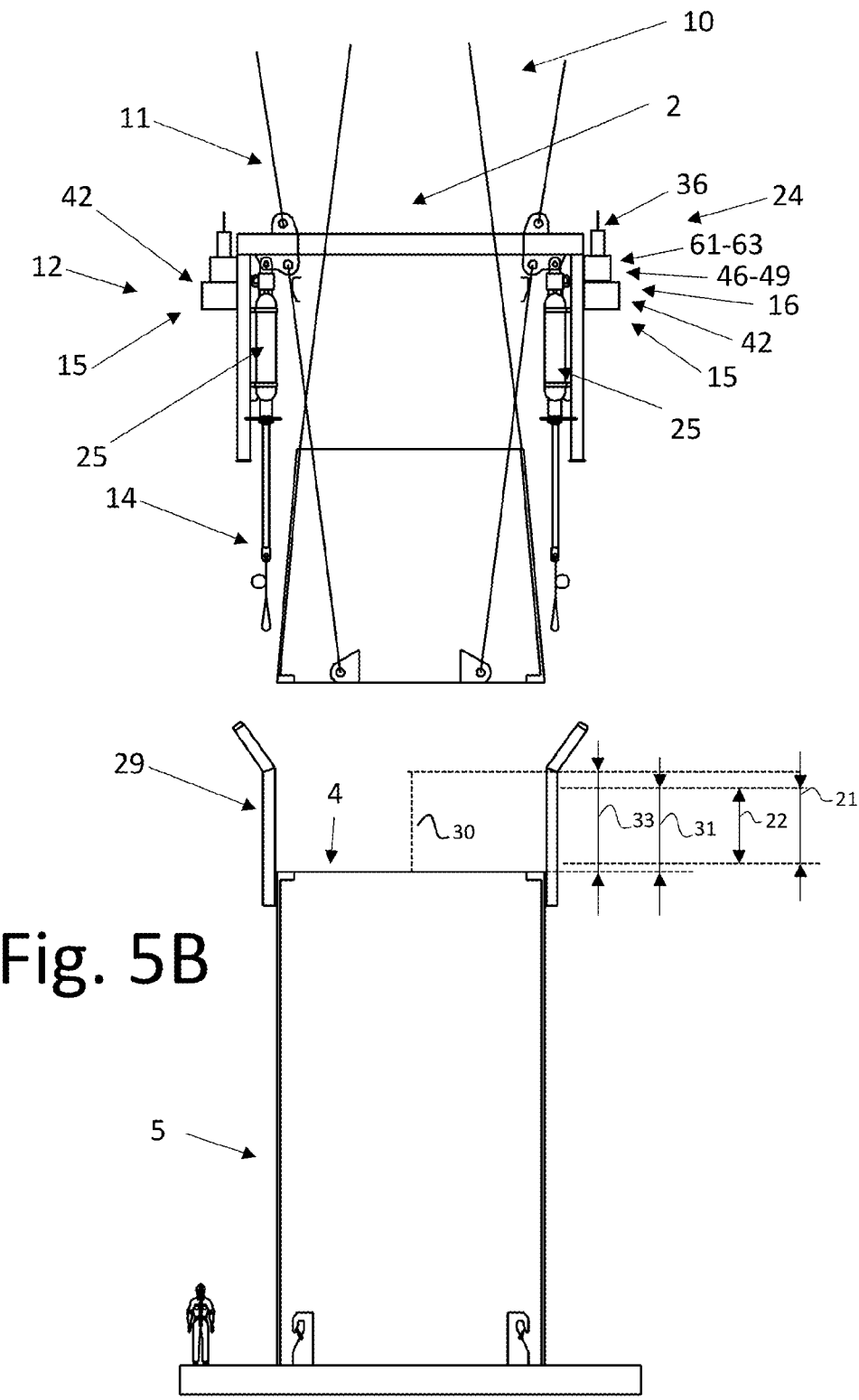

FIG. 5A differs from FIG. 4 in that the vessel 8 and the crane 7 to which the system 1 is attached are not shown. Also the seabed 6 which supports the support structure 5 is not shown. This applies in the same manner to the FIGS. 6A-8A. FIG. 5B show an enlarged view of part of FIG. 5A. This applies in the same manner to the FIGS. 6B-8B.

The FIGS. 5A and 5B show a similar situation as FIG. 3A. The crane 7 is used to position the wind turbine assembly 10 above the support surface 4 of the support structure 5. The complete system 1 moves along with the vertical reciprocal crane movement 22 and the horizontal reciprocal movement 45 of the crane 7.

The system 1 comprises a guiding assembly 29 to guide the wind turbine assembly 10, more specifically the mast 2, along a vertical guiding trajectory 30. The guiding assembly 29 is attached to the support structure 5 and can be removed again for further use. The guiding assembly 29 will assist in correct placement of the wind turbine assembly 10 on the support structure 4 by limiting relative horizontal movements between the wind turbine assembly 10 and the support structure 4 caused by horizontal reciprocal crane movement 45 of the crane 7. The guiding trajectory 30 extends upwardly from the support surface 4. A guiding length 33 of the guiding trajectory 30 is larger than the movement length 21 of the vertical reciprocal crane movement 22 of the crane 7, preferably 1.1, more preferably 1.5 times larger than the movement length 21. The guiding length 33 of the guiding trajectory 30 is in general between 1 and 8 meter.

The second counter force device 12 is attached to the first coupling assembly 11 and not attached to the wind turbine assembly 10 in order to transfer tensile forces in the second coupling system 1 to the crane 7 via the first coupling assembly 11 and not via the wind turbine assembly 10.

Figure 6A:
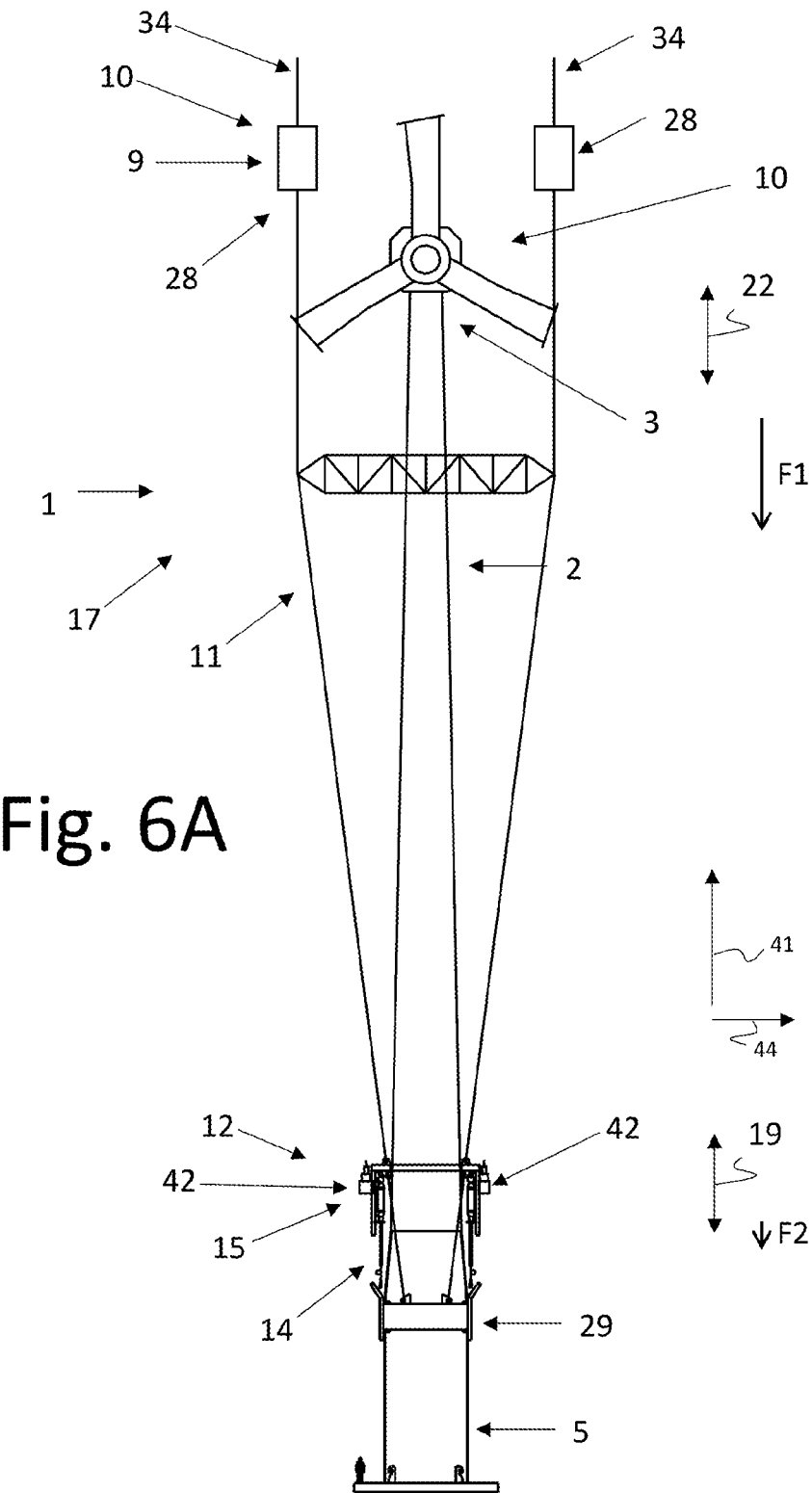
Figure 6B:
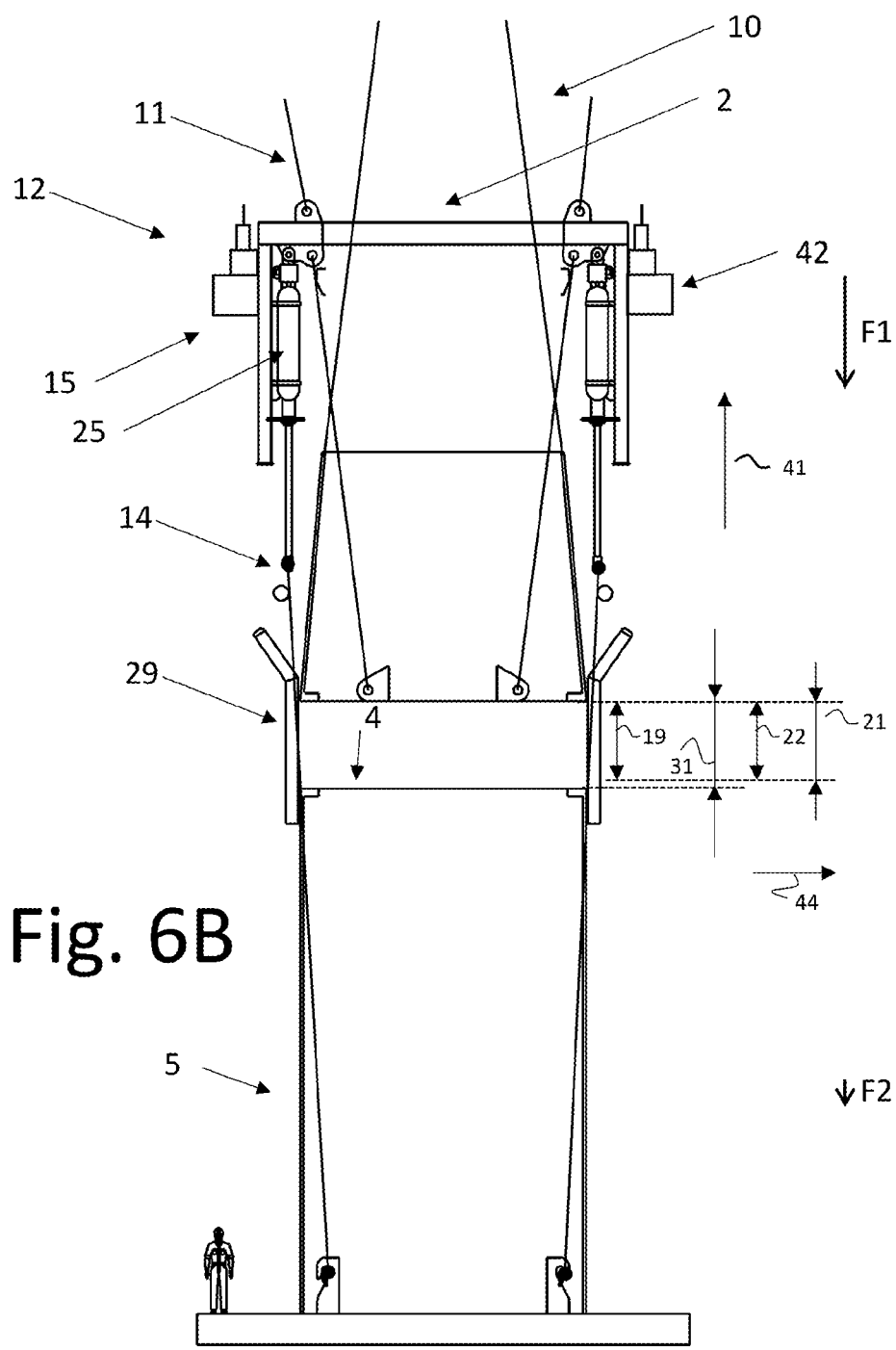

The FIGS. 6A and 6B show a similar situation as FIG. 3B. The wind turbine assembly 10 is positioned at a starting distance 31 above the support surface 4. In the shown situation, the wind turbine assembly 10 is located at the most upper position of its movement induced by the vertical reciprocal crane movement 22 of the crane 7.

The system 1 is in the first operation mode 17. The vertical reciprocal crane movement 22 of the crane 7 is compensated by the second reciprocal movement 19 of the wind turbine assembly 10 relative to the support structure 5 via the second counter force device 12. The second counter force device is similar as FIG. 9. At this stage, the second counter force device 12 provides a relatively small second counteracting force F2 which is negligible when compared with the first counteracting force F1 of the first counter force device 9. The first reciprocal movement 18 between the crane 7 and the wind turbine assembly 10 via the first counter force device 9 is about 0 meter.

Figure 7A:
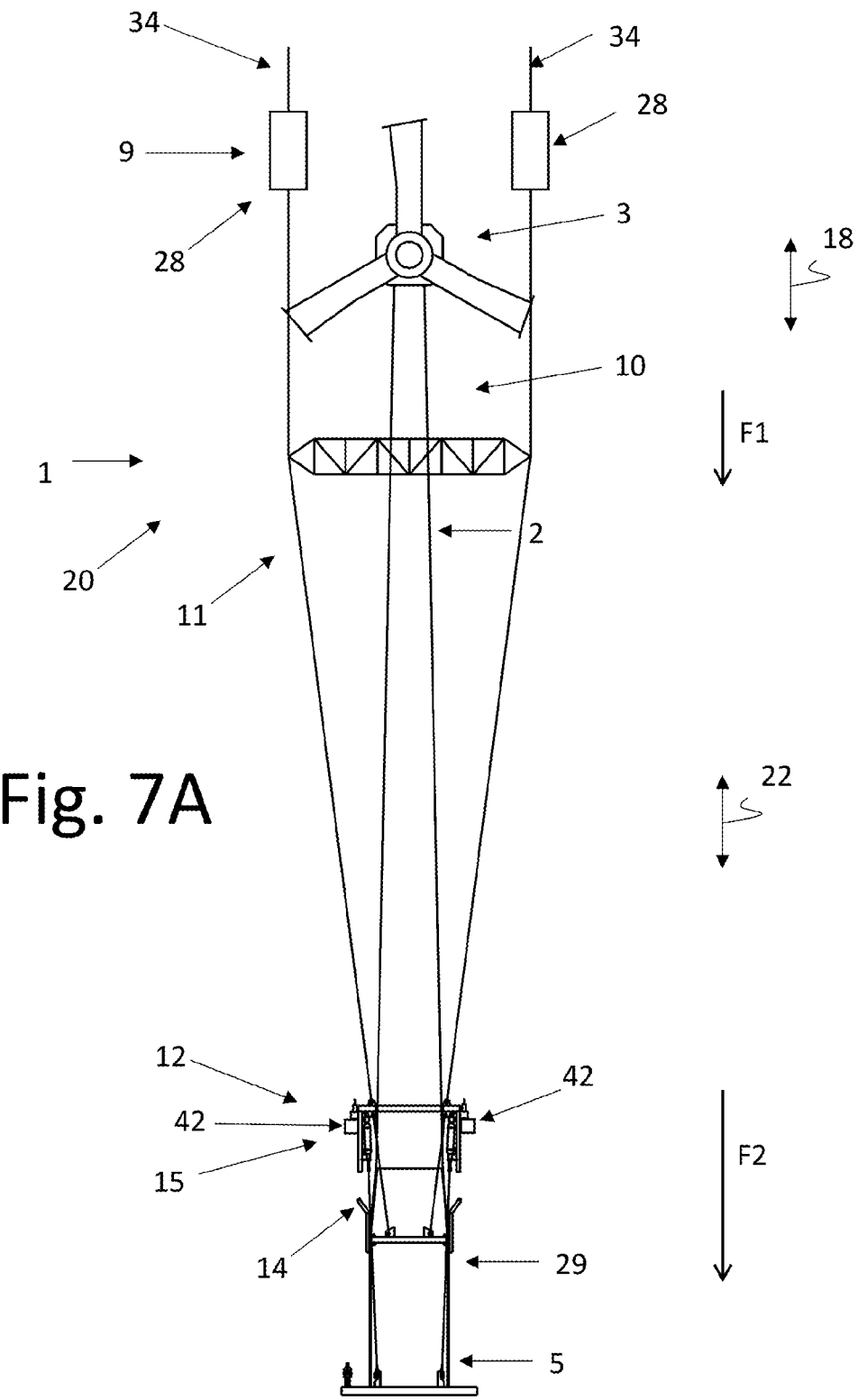
Figure 7B:
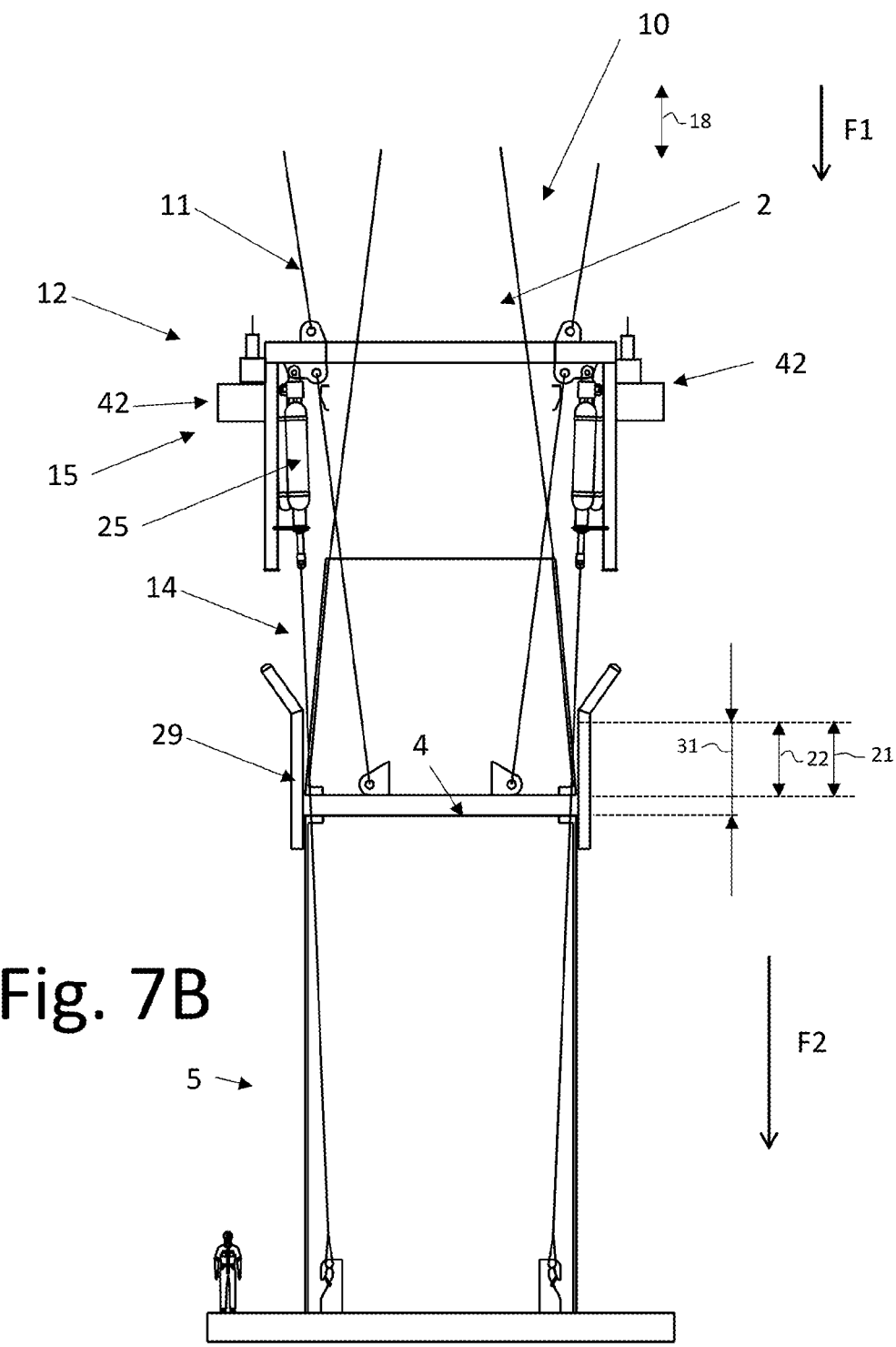

The FIGS. 7A and 7B shown a similar situation as FIG. 3C. The system is set in the second operation 20 mode by increasing the fluid pressure of the hydraulic fluid in the hydraulic cylinders 25. As result of this, the second counteracting force F2 of the second counter force device 12 is increased such that the vertical reciprocal crane movement 22 of the crane 7 relative to the support structure 5 is compensated by the first reciprocal movement 18 via the first counter force device 9. The second reciprocal movement 19 is about 0 meter. Due to the ratcheting unit 42, the wind turbine assembly 10 will be at the most lower position above the support surface 4 of the support structure 5.

Figure 8B:
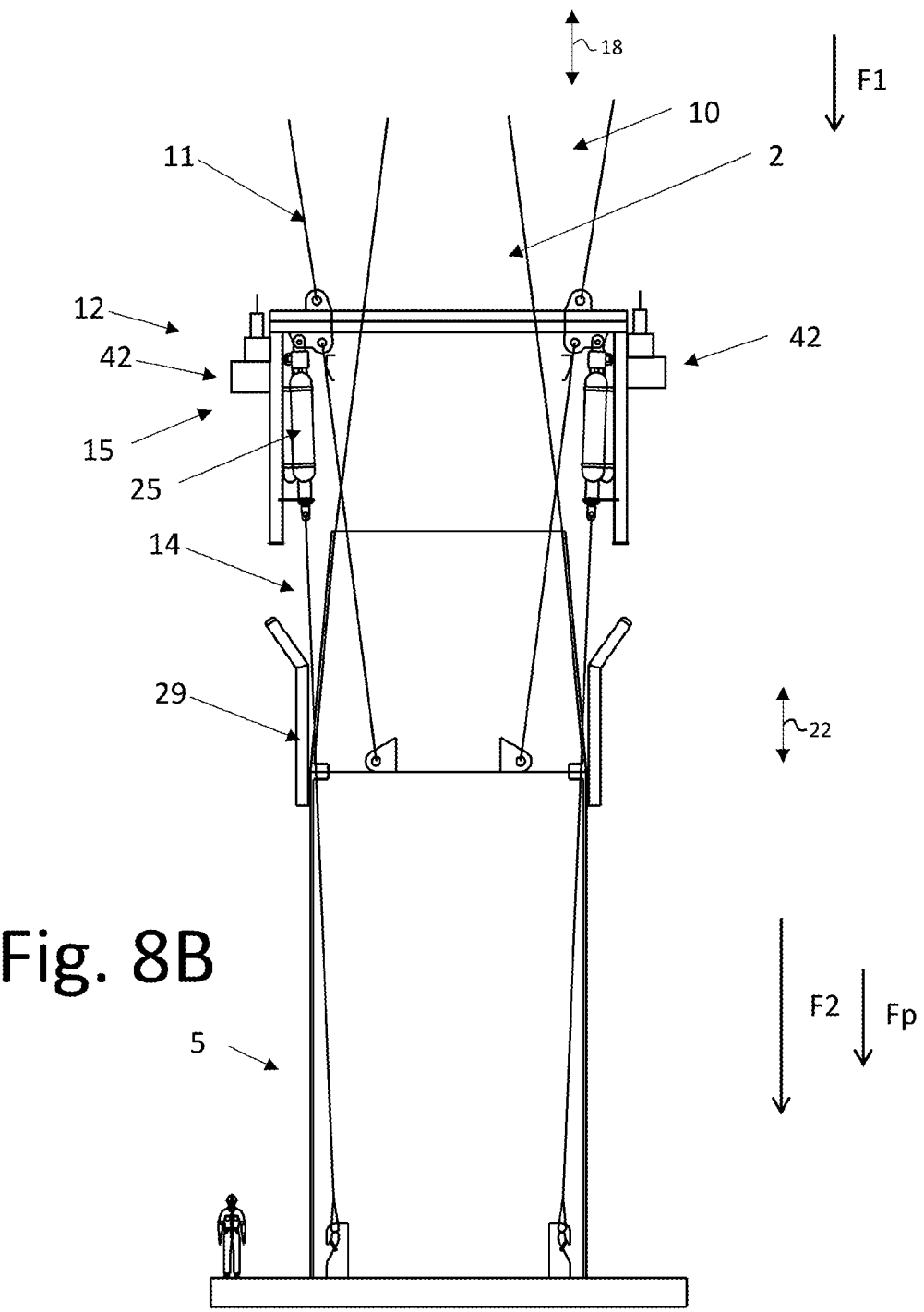

The FIGS. 8A and 8B show a similar situation as FIG. 3D. The pulling device 15 has been used to pull the wind turbine assembly 10 towards and onto the support structure 5. After the pulling device 15 has pulled the wind turbine assembly 10 onto the support surface 4, the pulling device 15 keeps applying its pulling force Fp on the wind turbine assembly 10. This way, the wind turbine assembly 10 is positioned on the support structure 5 in a stable manner. In addition to this, the second counter force device 12 also keeps applying the second counteracting force F2 on the wind turbine assembly 10.

After that, the crane 7 can be used to lower the first counter force device 9 towards the support structure 5 in order to create slack in the first coupling assembly 11 as shown in FIG. 3E in order secure the wind turbine assembly 10 to the support structure 5.

FIG. 10 shows a side view of a fourth embodiment of the system 1 according to the invention attached to a lifting crane 7 provided on a floating vessel 8. In this embodiment of the system 1, the support surface 4 of the support structure 5 is located above the water surface 23 and the wind turbine 3 is free from blades 13.

Figure 11A:
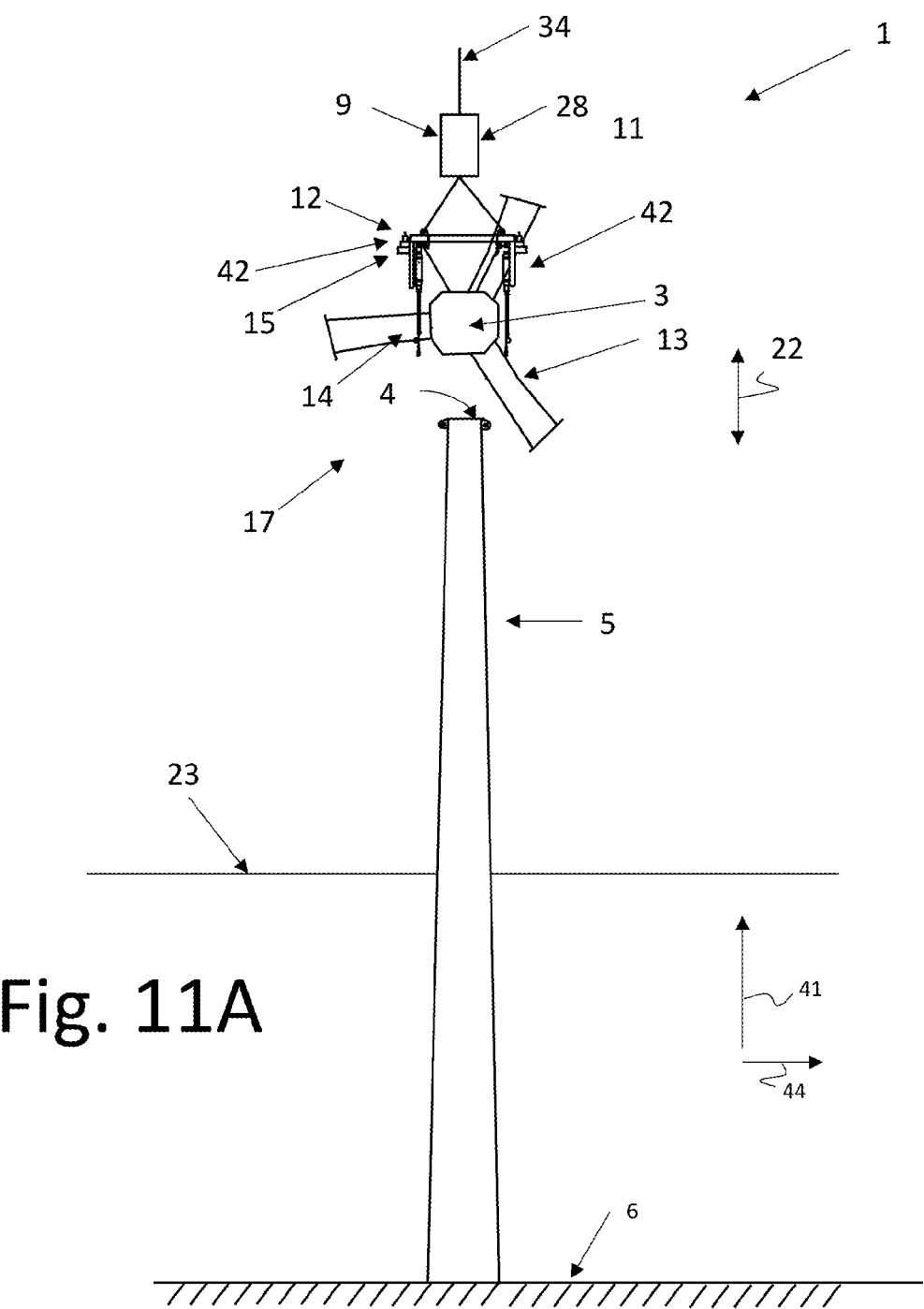

The FIGS. 11A and 11B show side views of a fifth embodiment of the system 1 according to the invention attached to a lifting crane (not shown) provided on a floating vessel (not shown). In this embodiment of the system 1, the wind turbine assembly 10 does not comprise a mast 2. In other words, the wind turbine assembly 10 is free from (part of) a mast 2. The second coupling assembly 14 is configured to be coupled to the outside of the support structure 5.

Figure 12A:
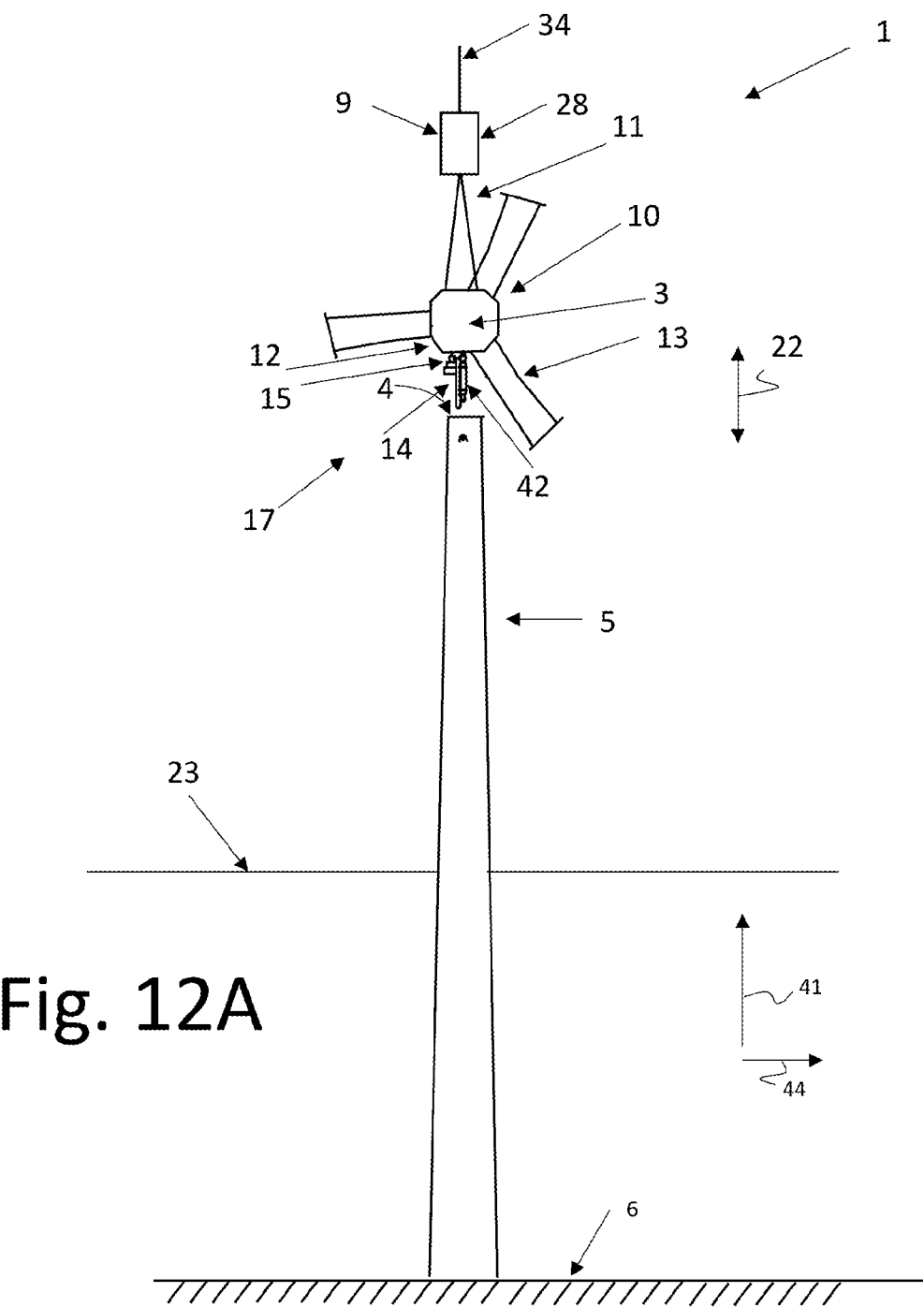
Figure 12B:
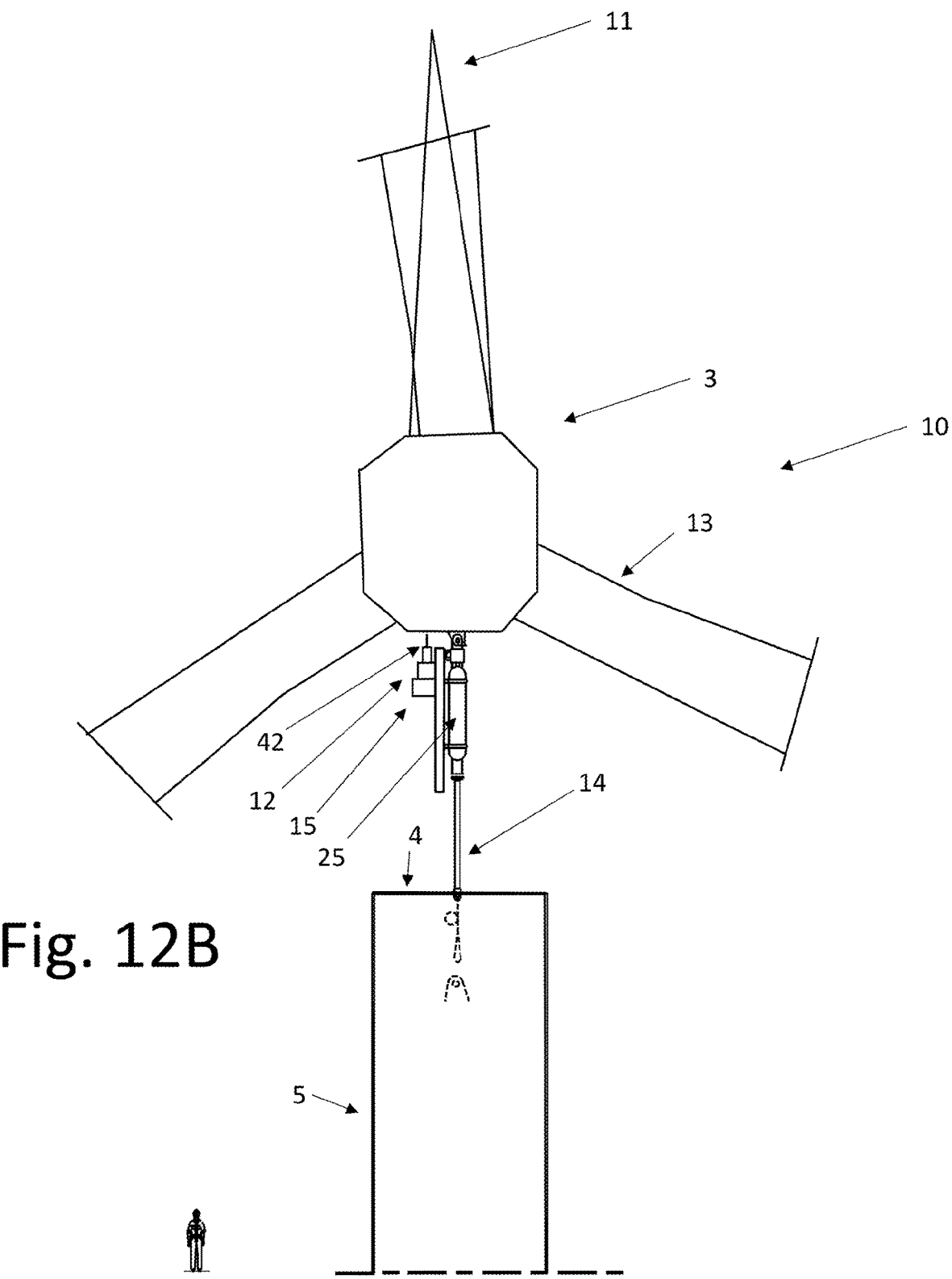

The FIGS. 12A and 12B show side views of a sixth embodiment of the system 1 according to the invention attached to a lifting crane (not shown) provided on a floating vessel (not shown).

The second coupling assembly 14 is configured to be coupled to the inside of the support structure 5.

As required, detailed embodiments of the present invention are disclosed herein; however, it is to be understood that the disclosed embodiments are merely exemplary of the invention, which can be embodied in various forms. There-

The invention claimed is:

1. A system for placing a wind turbine assembly on a support surface of a support structure being supported on a seabed with a lifting crane provided on a floating vessel, said system comprising;
   a first counter force device which is attachable to the crane,
   a first coupling assembly coupling the first counter force device to the wind turbine assembly in order to carry the wind turbine assembly,
   a second counter force device which is attachable to the wind turbine assembly and/or the first coupling assembly,
   a second coupling assembly coupling the second counter force device to the support structure, and
   a pulling device pulling the wind turbine assembly towards and onto the support surface of the support structure, and wherein;
   the first counter force device to allowing a vertical first reciprocal movement between the crane and the wind turbine assembly and controlling the first reciprocal movement by providing a first counteracting force F1 acting against the first reciprocal movement when the crane is moving away from the support structure,
   the second counter force device allowing aa vertical second reciprocal movement of the wind turbine assembly relative to the support structure and controlling the second reciprocal movement by providing a second counteracting force F2 acting against the second reciprocal movement when the crane is moving away from the support structure, and
   the system is adjustable from;
   a first operation mode wherein the first counteracting force F1 is larger than the second counteracting force F2 to, in use, compensate a vertical reciprocal crane movement of the crane relative to the support structure by the second reciprocal movement via the second counter force device, wherein the second reciprocal movement is larger than the first reciprocal movement, into
   a second operation mode wherein the first counteracting force F1 is smaller than the second counteracting force F2 to, in use, compensate the vertical reciprocal crane movement of the crane relative to the support structure by the first reciprocal movement via the first counter force device, wherein the first reciprocal movement is larger than the second reciprocal movement.

2. The system according to claim 1, wherein the first counter force device and the second counter force device are configured to, in the second operation mode, create the second reciprocal movement which is between 0 and 0.1 times the first reciprocal movement.

3. The system according to claim 1, wherein the first counter force device and the second counter force device are configured to, in the second operation mode, create the second reciprocal movement which is 0 m.

4. The system according to claim 1, wherein the first counter force device and the second counter force device are configured to compensate the vertical reciprocal crane movement of the crane in the second operation mode only by the first reciprocal movement via the first counter force device.

5. The system according to claim 1, wherein the first counter force device and the second counter force device are configured to, in the first operation mode, create the first reciprocal movement which is between 0 and 0.1 times the second reciprocal movement.

6. The system according to claim 1, wherein the first counter force device and the second counter force device are configured to, in the first operation mode, create the first reciprocal movement which is 0 meter.

7. The system according to claim 1, wherein the first counter force device and the second counter force device are configured to compensate the vertical reciprocal crane movement of the crane in the first operation mode only by the second reciprocal movement via the second counter force device.

8. The system according to claim 1, wherein the second counter force device comprises a ratcheting unit configured to preventing that the wind turbine assembly moves back away from the support structure when the wind turbine assembly has moved towards the support structure during the second reciprocal movement.

9. The system according to claim 1, wherein the pulling device is configured to pull the wind turbine assembly towards and onto the support structure via the second coupling assembly and not via the wind turbine assembly.

10. The system according to claim 1, wherein only the second counter force device is configured to adjust its second counteracting force F2, and the first counter force device is configured to apply a constant counteracting force F1.

11. The system according to claim 1, wherein the system comprises a guiding assembly guiding the wind turbine assembly along a vertical guiding trajectory during the vertical reciprocal crane movement, thereby limiting a horizontal wind turbine assembly movement of the wind turbine assembly.

12. The system according to claim 1, wherein the second counter force device is attachable to the first coupling assembly and not to the wind turbine assembly in order to transfer the second counteracting force F2 to the crane via the first coupling assembly.

13. A floating vessel comprising a lifting crane and a system according to claim 1 attached to the crane.

14. A method of placing a wind turbine assembly on a support surface of a support structure being supported on a seabed with a lifting crane
   provided on a floating vessel using the system according to claim 1, said method comprising the steps of;
   attaching the first counter force device to the crane of the vessel, using the first coupling assembly to couple the first counter force device to the wind turbine assembly, attaching the second counter force device to the wind turbine assembly and/or the first coupling assembly, using the crane to position the wind turbine assembly at a starting distance above the support surface of the support structure, which starting distance is larger than a movement length of a vertical reciprocal crane movement of the crane relative to the support structure, operating the system in the first operation mode, wherein the first counteracting force F1 of the first counter force device is larger than the second counteracting force F2 of the second counter force device, using the second coupling assembly to couple the second counter force device to the support structure, compensating the vertical reciprocal crane movement of the crane by the second reciprocal movement of the wind turbine assembly relative to the support structure via the second counter force device, wherein the second reciprocal movement is larger than the first reciprocal movement, operating the system in the second operation mode, wherein the first counteracting force F1 of the first counter force device is smaller than the second counteracting force F2 of the second counter force device in order to compensate the vertical reciprocal crane movement of the crane by the first reciprocal movement via the first counter force device, and wherein the first reciprocal movement is larger than the second reciprocal movement, and using the pulling device to pull the wind turbine assembly towards and onto the support surface of the support structure.

15. The method according to claim 14, wherein the first counter force device and the second counter force device are used to create, in the second operation mode, the second reciprocal movement which is between 0 and 0.1 times the first reciprocal movement.

16. The method according to claim 14, wherein the first counter force device and the second counter force device are used to create, in the second operation mode, the second reciprocal movement which is 0 m.

17. The method according to claim 14, wherein the vertical reciprocal crane movement of the crane, in the second operation mode, is only compensated by the first reciprocal movement via the first counter force device.

18. The method according to claim 14, wherein the first counter force device and the second counter force device are used to create, in the first operation mode, the first reciprocal movement which is between 0 and 0.1 times the second reciprocal movement.

19. The method according to claim 14, wherein the first counter force device and the second counter force device are used to create, in the first operation mode, the first reciprocal movement which is 0 meter.

20. The method according to claim 14, wherein the vertical reciprocal crane movement of the crane, in the first operation mode, is only compensated by the second reciprocal movement via the second counter force device.

* * * * *